(12) United States Patent
Onggosanusi et al.

(10) Patent No.: US 8,848,817 B2
(45) Date of Patent: Sep. 30, 2014

(54) TRANSMISSION MODES AND SIGNALING FOR UPLINK MIMO SUPPORT OR SINGLE TB DUAL-LAYER TRANSMISSION IN LTE UPLINK

(75) Inventors: Eko Onggosanusi, Allen, TX (US); Runhua Chen, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 13/098,967

(22) Filed: May 2, 2011

(65) Prior Publication Data
US 2012/0219042 A1    Aug. 30, 2012

Related U.S. Application Data

(60) Provisional application No. 61/329,864, filed on Apr. 30, 2010, provisional application No. 61/331,466, filed on May 5, 2010, provisional application No. 61/351,061, filed on Jun. 3, 2010, provisional application No. 61/355,850, filed on Jun. 17, 2010, provisional application No. 61/357,382, filed on Jun. 22, 2010, provisional application No. 61/372,608, filed on Aug. 11, 2010, provisional application No. 61/369,369, filed on Jul. 30, 2010, provisional application No. 61/364,671, filed on Jul. 15, 2010.

(51) Int. Cl.
*H04B 7/06* (2006.01)
*H04B 7/02* (2006.01)
*H04B 7/04* (2006.01)
*H04L 25/03* (2006.01)

(52) U.S. Cl.
CPC ........ *H04L 25/03923* (2013.01); *H04B 7/0469* (2013.01); *H04B 7/0456* (2013.01); *H04L 25/03929* (2013.01); *H04B 7/0473* (2013.01); *H04B 7/0465* (2013.01); *H04B 7/0478* (2013.01); *H04B 7/0639* (2013.01)
USPC ......................................................... 375/267

(58) Field of Classification Search
CPC .... H04B 7/0456; H04B 7/046; H04B 7/0469; H04B 7/0473; H04B 7/0478; H04B 7/0482; H04B 7/0486; H04B 7/0936; H04L 25/3898; H04L 25/03923; H04L 25/03929
USPC .......... 375/219, 267, 299, 340, 347; 370/252; 455/562.1
See application file for complete search history.

(56) References Cited

U.S. PATENT DOCUMENTS

2009/0262695 A1*   10/2009   Chen et al. ................... 375/260
2011/0249712 A1*   10/2011   Hammarwall et al. ....... 375/220

* cited by examiner

*Primary Examiner* — Betsy Deppe
(74) *Attorney, Agent, or Firm* — Ronald O. Neerings; Frederick J. Telecky, Jr.

(57) ABSTRACT

A method for mapping data in a wireless communication system. The method includes generating a precoding matrix for multi-antenna transmission based on a precoding matrix indicator (PMI) feedback from at least one remote receiver where the PMI indicates a choice of precoding matrix derived from a matrix multiplication of two matrices from a first code book and a second codebook. The method further includes precoding one or more layers of a data stream with the precoding matrix and transmitting the preceded layers of data stream to the remove receiver.

14 Claims, 5 Drawing Sheets

TRANSMISSION MODES AND SIGNALING FOR UPLINK MIMO SUPPORT OR SINGLE TB DUAL-LAYER TRANSMISSION IN LTE UPLINK

CLAIM OF PRIORITY

This application claims priority under 35 U.S.C. 119(e)(1) to U.S. Provisional Application No. 61/329,864 filed Apr. 30, 2010, U.S. Provisional Application No. 61/331,466 filed May 5, 2010, U.S. Provisional Application No. 61/351,061 filed Jun. 3, 2010 U.S. Provisional Application No. 61/355,850 filed Jun. 17, 2010, U.S. Provisional Application No. 61/357,382 filed Jun. 22, 2010, U.S. Provisional Application No. 61/364,671 filed Jul. 15, 2010, U.S. Provisional Application No. 61/369,369 filed Jul. 30, 2010, and U.S. Provisional Application No. 61/372,608 filed Aug. 11, 2010.

TECHNICAL FIELD OF THE INVENTION

The technical field of this invention is wireless communication such as wireless telephony.

BACKGROUND OF THE INVENTION

The present embodiments relate to wireless communication systems and, more particularly, to the precoding of Physical Downlink Shared Channel (PDSCH) data and dedicated reference signals with codebook-based feedback for multi-input multi-output (MIMO) transmissions.

With Orthogonal Frequency Division Multiplexing (OFDM), multiple symbols are transmitted on multiple carriers that are spaced apart to provide orthogonality. An OFDM modulator typically takes data symbols into a serial-to-parallel converter, and the output of the serial-to-parallel converter is considered as frequency domain data symbols. The frequency domain tones at either edge of the band may be set to zero and are called guard tones. These guard tones allow the OFDM signal to fit into an appropriate spectral mask. Some of the frequency domain tones are set to values which will be known at the receiver. Among these are Cell-specific Channel State Information Reference Signals (CSI-RS) and Dedicated or Demodulating Reference Signals (DMRS). These reference signals are useful for channel estimation at the receiver. In a multi-input multi-output (MIMO) communication systems with multiple transmit/receive antennas, the data transmission is performed via precoding. Here, precoding refers to a linear (matrix) transformation of a L-stream data into P-stream where L denotes the number of layers (also termed the transmission rank) and P denotes the number of transmit antennas. With the use of dedicated (user-specific) DMRS, a transmitter (base station, also termed eNodeB can perform any precoding operation which is transparent to a user equipment (UE) which acts as a receiver. At the same time, it is beneficial for the base station to obtain a recommendation on the choice of precoding matrix from the user equipment. This is particularly the case for frequency-division duplexing (FDD) where the uplink and downlink channels occupy different parts of the frequency bands, i.e. the uplink and downlink are not reciprocal. Hence, a codebook-based feedback from the UE to the eNodeB is preferred. To enable a codebook-based feedback, a precoding codebook needs to be designed.

The Rel. 8 Long-Term Evolution (LTE) specification includes a codebook for 2-antenna transmissions and a codebook for 4-antenna transmissions. While those codebooks are designed efficiently, they do not support transmissions with 8 antennas. Moreover, it is possible to further improve the performance of 4-antenna transmissions under different scenarios such as dual-polarized antenna arrays.

While the preceding approaches provide steady improvements in wireless communications, the present inventors recognize that still further improvements in downlink (DL) spectral efficiency are possible. Accordingly, the preferred embodiments described below are directed toward these problems as well as improving upon the prior art.

SUMMARY OF THE INVENTION

This invention is a method of mapping data in a wireless communication system. The method includes forming a first frame having plural positions at a first transmitter. The first frame has a first plurality of reference signals. A second frame having plural positions corresponding to the plural positions of the first frame is formed at a second transmitter remote from the first transmitter. The second frame has a second plurality of reference signals. A plurality of data signals is inserted into the first frame at positions that are not occupied by either the first or second plurality of reference signals. The plurality of data signals is inserted into the second frame at positions that are not occupied by either the first or second plurality of reference signals. The first and second frames are transmitted to a remote receiver.

BRIEF DESCRIPTION OF THE DRAWINGS

These and other aspects of this invention are illustrated in the drawings, in which.

DETAILED DESCRIPTION OF PREFERRED EMBODIMENTS

Figure 1:
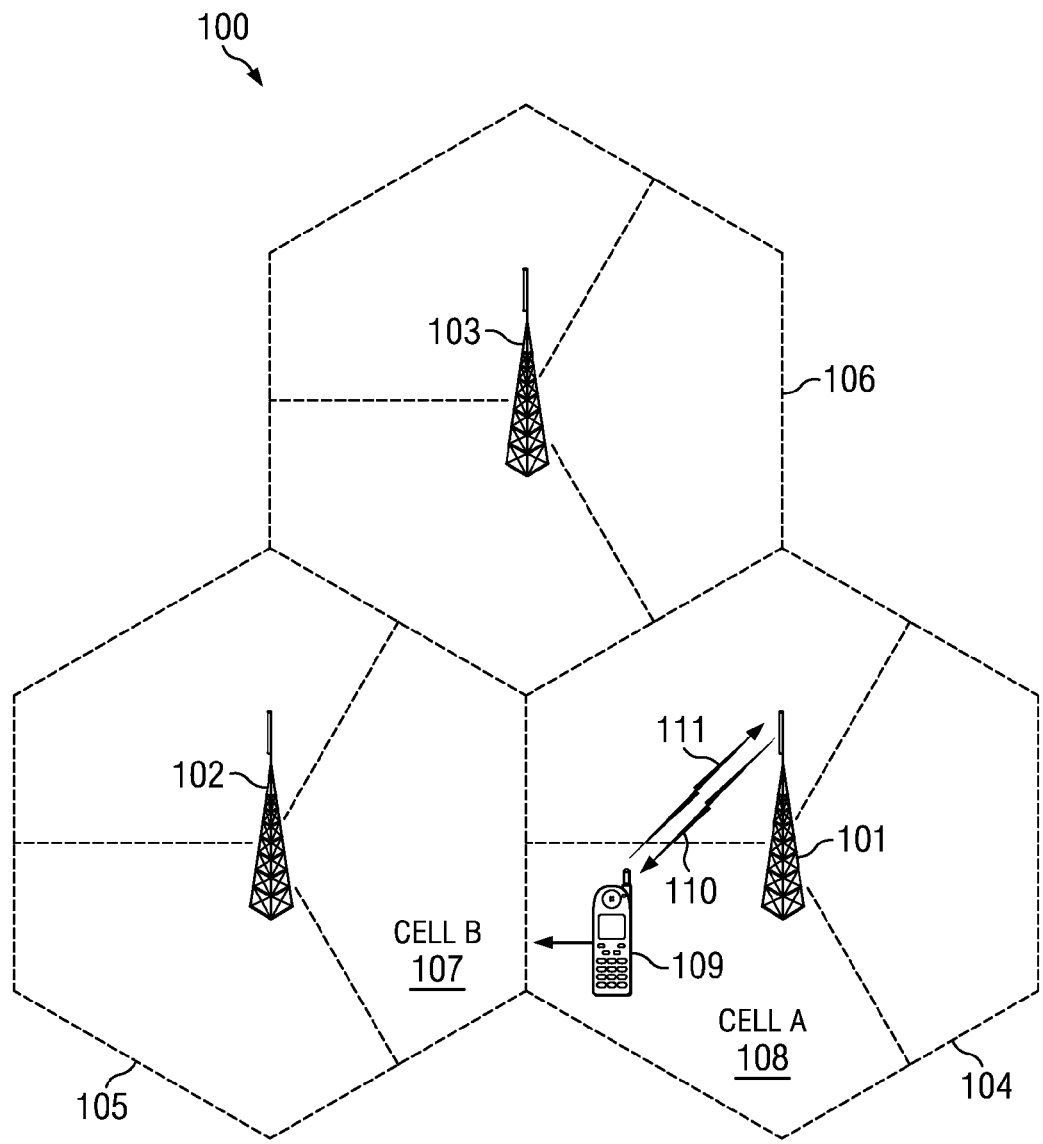
FIG. 1 illustrates an exemplary prior art wireless communication system to which this application is applicable.

FIG. 1 shows an exemplary wireless telecommunications network 100. The illustrative telecommunications network includes base stations 101, 102 and 103, though in operation, a telecommunications network necessarily includes many more base stations. Each of base stations 101, 102 and 103 (eNB) are operable over corresponding coverage areas 104, 105 and 106. Each base station's coverage area is further divided into cells. In the illustrated network, each base station's coverage area is divided into three cells. Handset or other user equipment (UE) 109 is shown in Cell A 108. Cell A 108 is within coverage area 104 of base station 101. Base station 101 transmits to and receives transmissions from UE 109. As UE 109 moves out of Cell A 108 and into Cell B 107, UE 109 may be handed over to base station 102. Because UE 109 is synchronized with base station 101, UE 109 can employ non-synchronized random access to initiate handover to base station 102.

Non-synchronized UE 109 also employs non-synchronous random access to request allocation of up-link 111 time or frequency or code resources. If UE 109 has data ready for transmission, which may be traffic data, measurements report, tracking area update, UE 109 can transmit a random access signal on up-link 111. The random access signal notifies base station 101 that UE 109 requires up-link resources to transmit the UEs data. Base station 101 responds by transmitting to UE 109 via down-link 110, a message containing the parameters of the resources allocated for UE 109 up-link transmission along with a possible timing error correction. After receiving the resource allocation and a possible timing advance message transmitted on down-link 110 by base station 101, UE 109 optionally adjusts its transmit timing and transmits the data on up-link 111 employing the allotted resources during the prescribed time interval.

Base station 101 configures UE 109 for periodic uplink sounding reference signal (SRS) transmission. Base station 101 estimates uplink channel quality information (CSI) from the SRS transmission.

Figure 2:
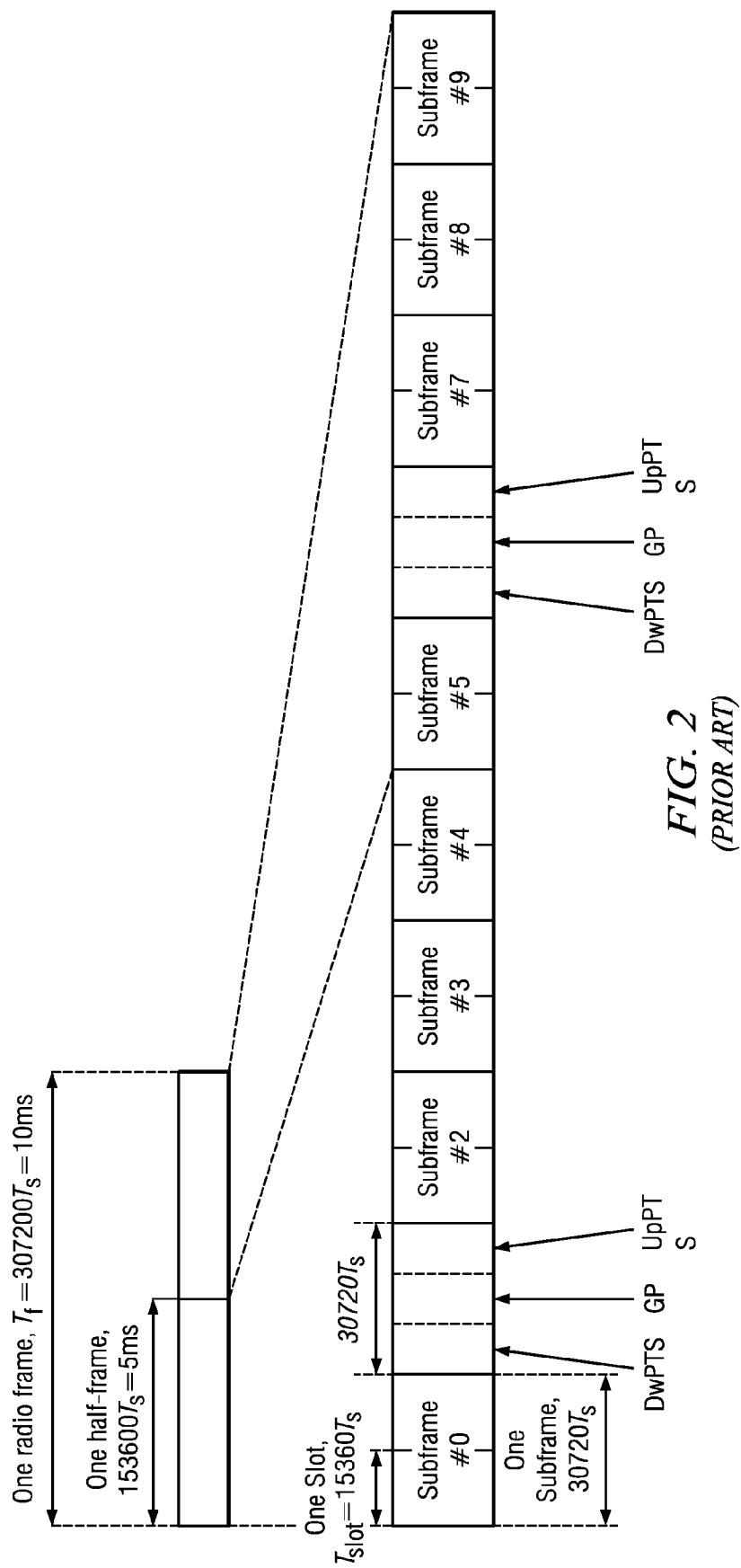
FIG. 2 shows the Evolved Universal Terrestrial Radio Access (E-UTRA) Time Division Duplex (TDD) frame structure of the prior art.

FIG. 2 shows the Evolved Universal Terrestrial Radio Access (E-UTRA) time division duplex (TDD) Frame Structure. Different subframes are allocated for downlink (DL) or uplink (UL) transmissions. Table 1 shows applicable DL/UL subframe allocations.

TABLE 1

| Con-figuration | Switch-point periodicity | Sub-frame number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 10 ms | D | S | U | U | U | D | S | U | U | D |

The preferred embodiments of the present invention provide improved communication through precoded multi-antenna transmission with codebook-based feedback. In a cellular communication system a user equipment (UE) is uniquely connected to and served by a single cellular base station (eNB) at a given time. An example of such system is the 3GPP Long-Term Evolution (LTE) which includes the LTE-Advanced (LTE-A) system. With increasing number of transmit antennas at the eNB, the task of designing an efficient codebook with desirable properties is challenging. This set of properties includes the following for 8-antenna-port (termed 8 Tx) system.

(1) Applicability for several relevant antenna setups and spatial channel conditions. Relevant 8 Tx antenna setups typically result in a structured spatial covariance matrix which is a long-term channel statistics. Some relevant antenna setups for 8 Tx include: Uniform linear array (ULA) with L/2 (half wavelength) spacing; 4 dual-polarized elements with L/2 spacing between two elements; and 4 dual-polarized elements with 4 L (larger) spacing between two elements (2) Applicability for both Single User Multiple Input, Multiple Output (SU-MIMO) and Multiple User Multiple Input, Multiple Output (MU-MIMO).

(3) Finite alphabet whereby each matrix element belongs to a finite set of values or constellation such as Quadrature Phase Shift Keying (QPSK) or Phase Shift Keying (8PSK) alphabet.

(4) Constant modulus where all elements in a precoding matrix have the same magnitude. This ensures power amplifier (PA) balance property in all scenarios.

(5) Nested property where every matrix/vector of rank-n is a sub-matrix of a rank-(n+1) precoding matrix, n=1, 2, ... N−1 where N is the maximum number of layers.

(6) The associated signaling overhead should be minimized especially UE feedback.

A precoding structure that fulfills properties 1 and 2 separates the long-term and short-term components of the precoder. Long-term and short-term refer to the need for feedback interval or time granularity which may be associated with frequency granularity as well. The long-term component does not need high frequency granularity while the short-term component may need higher frequency granularity. A particular structure of interest known as a dual-stage precoder is as follows:

$$W=f(W_1,W_2) \quad (1)$$

where: $W_1$ is the long-term component; and $W_2$ is the short-term component. Each component is assigned a codebook. Thus two distinct codebooks $CB_1$ and $CB_2$ are needed. $W_1$ adapts to the long-term channel statistics such as the spatial covariance matrix. $W_2$ adapts to the short-term channel properties such as phase adjustment needed to counteract short-term fading. For this structure the feedback overhead can be potentially reduced as compared to a one-stage counterpart since $W_1$ does not need to be updated as often as $W_2$. An example of the matrix function f(.,.) includes a product (matrix multiplication) function f(x,y)=xy or the Kronecker product function $f(x,y)=x \otimes y$. The dual-stage representation in (1) can be thought as a multiple-codebook design where:

(1) A set of N codebooks $\{W_1^{(0)}, W_1^{(1)}, \ldots, W_1^{(N-1)}\}$ are defined where one codebook is selected out of the N codebooks in a long-term basis. This (first) codebook is represented by $W_1$ in equation (1). The choice of $W_1$ is enumerated by a precoding matrix indicator $PMI_1$ where $PMI_1 \in \{0, 1, \ldots, N-1\}$.

(2) The short-term precoding matrix/vector is then derived from the chosen codebook via a short-term operation. The short-term operation is represented by $W_2$ in (1). Note that $W_2$ can be as simple as selecting a sub-matrix of $W_1$ or performing linear combining across a subset of column vectors of $W_1$. In this case, all possible $W_2$ matrices/vectors (for a given $W_1$) formed a second codebook $CB_2$. For an efficient design, the second codebook $CB_2$ is made dependent on the choice of the first codebook W. The choice of $W_2$ is enumerated by a precoding matrix indicator $PMI_2$ where $PMI_2 \in \{0, 1, \ldots, M_2-1\}$ where $M_2=|CB_2(PMI_1)|$. Notice the dependence of $CB_2$ on $PMI_1$.

Figure 3:
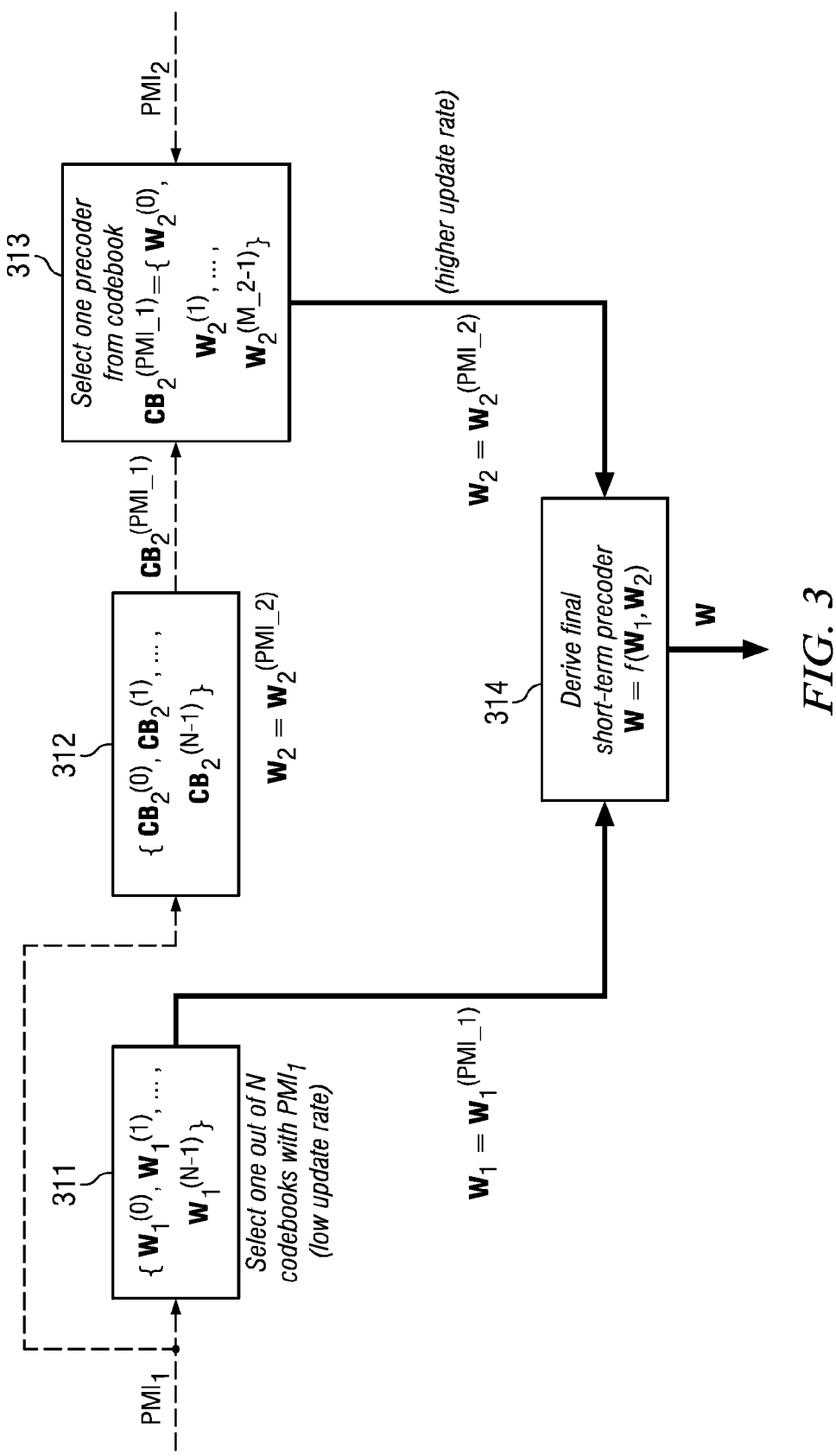
FIG. 3 is a simplified block diagram describing a precoder selection mechanism at the receiver (UE) based on the dual-stage codebook.

FIG. 3 illustrates the precoding matrix/vector selection process. The final precoding matrix/vector is a function of two PMIs:

$$W=f(PMI_1,PMI_2) \quad (2)$$

where: $PMI_1$ is updated at a significantly less frequent rate than $PMI_2$. $PMI_1$ is intended for the entire system bandwidth while $PMI_2$ can be frequency-selective.

FIG. 3 illustrates the technique used in downlink LTE-Advanced (LTE-A). The UE selects $PMI_1$ and $PMI_2$ and hence $W_1$ and $W_2$ in a manner similar to the LTE feedback paradigm.

The UE first selects the first precoder codebook $W_1$ (block 311) based on the long-term channel properties such as spatial covariance matrix such as in a spatial correlation domain from an input of $PMI_1$. This is done in a long-term basis consistent with the fact that spatial covariance matrix needs to be estimated over a long period of time and in a wideband manner.

Conditioned upon $W_1$, the UE selects $W_2$ based on the short-term (instantaneous) channel. This is a two stage process. Block 312 selects one of a set of codebooks $CB_2^{(0)}$ to $CB_2^{(N-1)}$ based upon the $PMI_1$ input. Block 3132 selects one precoder corresponding to the selected codebook $CB_2^{(PMI_1)}$ and $PMI_2$. This selection may be conditioned upon the selected rank indicator (RI). Alternatively, RI can be selected jointly with $W_2$. Block 314 takes the selected $W_1$ and $W_2$ and forms the function $f(W_1, W_2)$.

$PMI_1$ and $PMI_2$ are reported to the base station (eNodeB or eNB) at different rates and/or different frequency resolutions.

Based on this design framework, several types of codebook design are described. While each type can stand alone, it is also possible to use different types in a single codebook design especially if the design is intended for different scenarios. A simple yet versatile design can be devised as follows:

$PMI_1$ selects one of the N codebooks $W_1$ as indicated above.

$PMI_2$ selects at least one of the column vectors of W. The number of selected column vectors is essentially the recommended transmission rank (RI).

This design allows construction of N different scenarios where the codebook $W_1$ for each scenario is chosen to contain a set of basis vectors for a particular spatial channel characteristic $W_2$. While any two-dimensional function can be used in equation (2), the patent application assumes a product (matrix multiplication) function $f(x,y)=xy$. Thus the final short-term precoding matrix/vector is computed as a matrix product of $W_1$ and $W_2$: $W=W_1 W_2$.

Consider an embodiment of a dual-codebook design for 8 Tx ULA with L/2 spacing at the transmitter (eNB). For this particular antenna setup, a set of discrete Fourier transform (DFT) vectors forms a complete basis and hence serves as a good codebook. The following construction for rank-1 transmission can be used:

$$W_1 = \frac{1}{2\sqrt{2}} \begin{bmatrix} 1 & 1 & \cdots & 1 \\ 1 & e^{j\frac{2\pi}{8}} & \cdots & e^{j(7)\frac{2\pi}{8}} \\ \vdots & \vdots & \ddots & \vdots \\ 1 & e^{j(7)\frac{2\pi}{8}} & \cdots & e^{j(7)(7)\frac{2\pi}{8}} \end{bmatrix}, \quad (3)$$

$$CB_2 = \left\{ \begin{bmatrix} 1 \\ 0 \\ \vdots \\ 0 \end{bmatrix}, \begin{bmatrix} 0 \\ 1 \\ \vdots \\ 0 \end{bmatrix}, \ldots, \begin{bmatrix} 0 \\ 0 \\ \vdots \\ 1 \end{bmatrix} \right\}$$

Here N=1 thus having no need for $PMI_1$. $CB_2$ consists of 8 selection vectors which imply at least 3 bits of signaling for $PMI_2$. For higher ranks, $CB_2$ represents group selection. For example $CB_2$ for rank-2 may include all or a subset of the twenty eight possible 8×2 group selection matrices which selects 2 out of 8 beams.

This represents the critically-sampled DFT vectors. Generally it is beneficial to use oversampled DFT vectors especially for MU-MIMO or space-division multiple access (SDMA) applications. While a design with N=1 with 8×8n matrix $W_1$, where n is the oversampling factor, is possible, overhead reduction for updating $W_2$ can be obtained by partitioning the 8n DFT vectors into multiple $W_1$ matrices. Such partitioning uses the fact that the direction of arrival (DoA) varies quite slowly for each UE. With n=4 resulting in a total of 32 DFT vectors and keeping the size of $W_1$ as 8×8, the following construction can be used:

$$W_1^{(n)} = \frac{1}{2\sqrt{2}} \times \begin{bmatrix} 1 & 0 & \cdots & 0 \\ 0 & e^{j(8)\frac{2\pi}{(8)(4)}n} & \cdots & 0 \\ \vdots & \vdots & \ddots & \vdots \\ 0 & 0 & \cdots & e^{j(7)(8)\frac{2\pi}{(8)(4)}n} \end{bmatrix} \begin{bmatrix} 1 & 1 & \cdots & 1 \\ 1 & e^{j\frac{2\pi}{(8)(4)}} & \cdots & e^{j(7)\frac{2\pi}{(8)(4)}} \\ \vdots & \vdots & \ddots & \vdots \\ 1 & e^{j(7)\frac{2\pi}{(8)(4)}} & \cdots & e^{j(7)(7)\frac{2\pi}{(8)(4)}} \end{bmatrix}, \quad (4)$$

$$n = 0, 1, 2, 3$$

$$CB_2 = \left\{ \begin{bmatrix} 1 \\ 0 \\ \vdots \\ 0 \end{bmatrix}, \begin{bmatrix} 0 \\ 1 \\ \vdots \\ 0 \end{bmatrix}, \ldots, \begin{bmatrix} 0 \\ 0 \\ \vdots \\ 1 \end{bmatrix} \right\}$$

Here $CB_2$ (size-8) is the same for different $W_1$ matrices. In this case N=4. The selection of $W_1$ is indicated by $PMI_1$ which requires a 2-bit signaling. This divides the DoA space into 4 partitions.

Partition 1 (n=0): DoA={0, 22.5, 45, 67.5} in degrees,
Partition 2 (n=1): DoA={90, 112.5, 135, 157} in degrees,
Partition 3 (n=2): DoA={180, 202.5, 225, 247.5} in degrees, and
Partition 4 (n=3): DoA={270, 292.5, 315, 337.5} in degrees.

A total of 32 length-8 vectors are obtained from $\{W_1^{(0)}, W_1^{(1)}, W_1^{(2)}, W_1^{(3)}\}$ which amounts to oversampling the 8-dimensional angle space by a factor of 4. It is possible to synthesize each of the 32 vectors from the 8-DFT matrix used in equation (3) as the 8 orthonormal column vectors in the 8-DFT matrix form a complete basis for 8-dimensional complex-valued space. This is be achieved by choosing $W_2$ accordingly. This minimizes the number of $W_1$, but it increases the required number $W_2$ vectors. This increase goes against the purpose of saving the short-term feedback overhead incurred by $W_2$.

This construction divides the DoA space into 4 partitions. Each UE may update $PMI_1$ and thus $W_1$ at a lower rate as the DoA region in which each UE resides changes slowly. The precise DoA may change at a faster rate. This is adapted with the change of $W_2$.

This construction can be generalized to any oversampling factor n and any number of partitions. A design with n=2 resulting in a total of 16 DFT vectors is shown in equation (4b). In this case N=2. The selection of $W_1$ is indicated by $PMI_1$ which requires 1-bit signaling. This divides the DoA space into 2 partitions.

Partition 1 (n=0): DoA={0, 22.5, 45, 67.5, 90, 112.5, 135, 157.5} in degrees, and
Partition 2 (n=1): DoA={180, 202.5, 225, 247.5, 270, 292.5, 315, 337.5} in degrees.

$$W_1^{(n)} = \frac{1}{2\sqrt{2}} \times \begin{bmatrix} 1 & 0 & \cdots & 0 \\ 0 & e^{j(8)\frac{2\pi}{(8)(2)}n} & \cdots & 0 \\ \vdots & \vdots & \ddots & \vdots \\ 0 & 0 & \cdots & e^{j(7)(8)\frac{2\pi}{(8)(2)}n} \end{bmatrix} \quad (4b)$$

$$\begin{bmatrix} 1 & 1 & \cdots & 1 \\ 1 & e^{j\frac{2\pi}{(8)(2)}} & \cdots & e^{j(7)\frac{2\pi}{(8)(2)}} \\ \vdots & \vdots & \ddots & \vdots \\ 1 & e^{j(7)\frac{2\pi}{(8)(2)}} & \cdots & e^{j(7)(7)\frac{2\pi}{(8)(2)}} \end{bmatrix},$$

$n = 0, 1$ $$CB_2 = \left\{ \begin{bmatrix} 1 \\ 0 \\ \vdots \\ 0 \end{bmatrix}, \begin{bmatrix} 0 \\ 1 \\ \vdots \\ 0 \end{bmatrix}, \cdots, \begin{bmatrix} 0 \\ 0 \\ \vdots \\ 1 \end{bmatrix} \right\}$$

Instead of dividing the DoA space into several DoA-contiguous partitions, it is possible to divide the DoA space into N comb-like partitions as shown in equation (5).

$$W_1^{(n)} = \frac{1}{2\sqrt{2}} \times \begin{bmatrix} 1 & 0 & \cdots & 0 \\ 0 & e^{j\frac{\pi n}{4N}} & \cdots & 0 \\ \vdots & \vdots & \ddots & \vdots \\ 0 & 0 & \cdots & e^{j7\frac{\pi n}{4N}} \end{bmatrix} \begin{bmatrix} 1 & 1 & \cdots & 1 \\ 1 & e^{j\frac{2\pi}{8}} & \cdots & e^{j(7)\frac{2\pi}{8}} \\ \vdots & \vdots & \ddots & \vdots \\ 1 & e^{j(7)\frac{2\pi}{8}} & \cdots & e^{j(7)(7)\frac{2\pi}{8}} \end{bmatrix}, \quad (5)$$

$n = 0, 1, \ldots, N-1$

With N=2 this results in the following 2 partitions:

Partition 1: DoA={0, π/4, π/2, 3π/4, π, 5π/4, 3π/2, 7π/4} in radians, and

Partition 1: DoA=π/8+{0, π/4, π/2, 3π/4, π, 5π/4, 3π/2, 7π/4} in radians.

One of the drawbacks of this design is the need for higher update rate of $PMI_1$ because a slight change of DoA over time requires updating $W_1$. Unless $W_1$ is updated at the same rate as $W_2$ the short-term adaptation, this design may not be preferred from overhead perspective.

When using this design for higher ranks, the same set or different sets of $W_1$ matrices can be used as codebook $CB_1$ for different ranks. Regardless, there are several possible schemes that can be used to construct higher-rank precoding matrices from these $W_1$ constructions. Some schemes include construction based on group selection of the columns of $W_1$. For $W_1$ of size 8×M, $CB_2$ for rank-2 consists of all or a subset of the M*(M−1)/2 possible M×2 group selection matrices which selects 2 out of M beams. This is possible, but the composite precoding matrix W is preferably unitary to ensure constant output power. This cannot be guaranteed for any $W_2$ matrix unless $W_2$ is also unitary. A precoding matrix for higher rank can be constructed only from orthogonal column vectors of W. For example take the rank-1 construction in equation (4b) where M=8. For a given $W_1$ and one of its column vectors v, there are 3 other column vectors that are orthogonal to v. Table 2 shows this in terms of beam angle θ where the corresponding length-8 vector is:

$$v(\theta) = \frac{1}{2\sqrt{2}} \times [\, 1 \quad e^{j\theta} \quad e^{j2\theta} \quad e^{j3\theta} \quad e^{j4\theta} \quad e^{j5\theta} \quad e^{j6\theta} \quad e^{j7\theta} \,]^T \quad (5)$$

It is possible to may construct the higher rank codebooks up to rank-4 while ensuring the composite precoding matrix is unitary. A nested property can also be enforced. The following rank-2 design can be used. The vector v(θ) corresponding to the beam angle θ in second column of Table 2 represents the first column of the composite precoding matrix W. If the column ordering of W which represents ordering across layers is considered a redundancy and hence not considered in generating distinct precoding matrices and not incorporated into the codebook design, than a given $W_2$ allows 3+3+2+2+1+1+0+0 or 12 distinct rank-2 precoding matrix W. The size-12 codebook resulting from a given $W_1$ or n is given by:

$$\left\{ \begin{array}{l} [\,v(0) \;\; v(\frac{\pi}{4})\,], [\,v(0) \;\; v(\frac{\pi}{2})\,], [\,v(0) \;\; v(\frac{3\pi}{4})\,], \\ [\,v(\frac{\pi}{8}) \;\; v(\frac{3\pi}{8})\,], [\,v(\frac{\pi}{8}) \;\; v(\frac{5\pi}{8})\,], [\,v(\frac{\pi}{8}) \;\; v(\frac{7\pi}{8})\,], \\ [\,v(\frac{\pi}{4}) \;\; v(\frac{\pi}{2})\,], [\,v(\frac{\pi}{4}) \;\; v(\frac{3\pi}{4})\,], [\,v(\frac{3\pi}{8}) \;\; v(\frac{5\pi}{8})\,], \\ [\,v(\frac{3\pi}{8}) \;\; v(\frac{7\pi}{8})\,], [\,v(\frac{\pi}{2}) \;\; v(\frac{3\pi}{4})\,], [\,v(\frac{5\pi}{8}) \;\; v(\frac{7\pi}{8})\,] \end{array} \right\}$$

For $W_1$ given in equation (4b), the corresponding $CB_2$ is given below where $e_n$ denotes a length-8 column vector with 1 in the n-th row and zero elements elsewhere:

{$[e_1e_3], [e_1e_5], [e_1e_7], [e_2e_4], [e_2e_8], [e_3e_5], [e_3e_7],$
$[e_4e_6], [e_4e_8], [e_5e_7], [e_6e_8]$}

The composite rank-2 codebook is then computed as $W=W_1W_2$.

Table 2 is a beam angle table of the resulting orthogonal vectors based on equation (4b).

TABLE 2

| n | θ (beam angle) | Set of θ's resulting in orthogonal vectors within the same $W_1$ |
|---|---|---|
| 0 | 0 | {π/4, π/2, 3π/4} |
|   | π/8 | π/8 + {π/4, π/2, 3π/4} |
|   | π/4 | {0, π/2, 3π/4} |
|   | 3π/8 | π/8 + {0, π/2, 3π/4} |
|   | π/2 | {0, π/4, 3π/4} |
|   | 5π/8 | π/8 + {0, π/4, 3π/4} |
|   | 3π/4 | {0, π/4, π/2} |
|   | 7π/8 | π/8 + {0, π/4, π/2} |
| 1 | π | π + {π/4, π/2, 3π/4} |
|   | 9π/8 | 9π/8 + {π/4, π/2, 3π/4} |
|   | 5π/4 | π + {0, π/2, 3π/4} |
|   | 11π/8 | 9π/8 + {0, π/2, 3π/4} |
|   | 4π/3 | π + {0, π/4, 3π/4} |
|   | 13π/8 | 9π/8 + {0, π/4, 3π/4} |
|   | 7π/4 | π + {0, π/4, π/2} |
|   | 15π/8 | 9π/8 + {0, π/4, π/2} |

Rank-3 and rank-4 codebooks can be designed similarly. Following the above design methodology:

A size-8 rank-3 codebook (and hence $CB_2$) can be constructed for a given $W_1$ (or n). Here, $CB_2$ is:

{$[e_1e_3e_5], [e_1e_3e_7], [e_1e_5e_7], [e_3e_5e_7], [e_2e_4e_6], [e_2e_4e_8],$
$[e_2e_6e_8], [e_4e_6e_8]$}

A size-2 rank-4 codebook (and hence $CB_2$) can be constructed for a given $W_1$ or n.

{$[e_1e_3e_5e_7], [e_2e_4e_6e_7]$}

Figure 4:
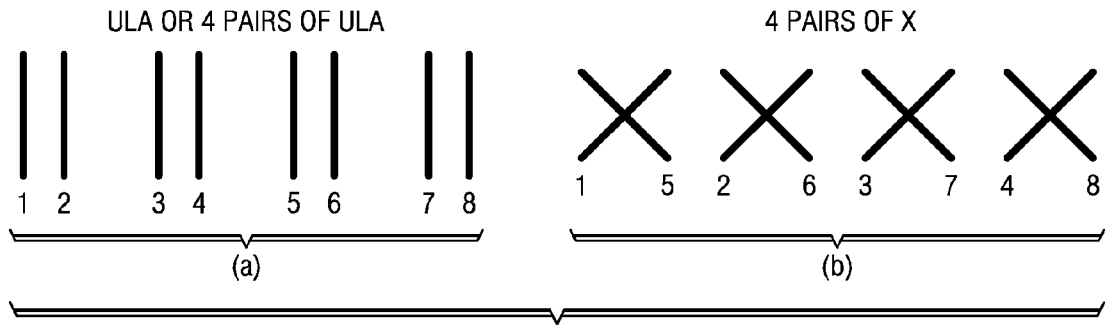
FIG. 4 shows some examples of configuration for 8-antenna array (a) array of ULA pairs (b) dual-polarized array.

In the second part of this invention, a dual-codebook design exploits a certain product structure of the spatial channel. This is suitable for pairs of ULA as well as pairs of dual-polarized array setup as illustrated in FIG. 4. Using the 8 Tx dual-polarized setup illustrated in FIG. 4(b) and assuming the spacing of L/2 between two dual-polarized antenna elements, the spatial channel covariance matrix can be approximated as follows:

$$C \approx \begin{bmatrix} C_H & 0 \\ 0 & C_V \end{bmatrix} = \begin{bmatrix} C_{ULA-4} & 0 \\ 0 & C_{ULA-4} \end{bmatrix}$$

The 4×4 covariance matrices $C_H$ and $C_V$ follow that of the 4 Tx ULA. The spatial covariance matrix is block diagonal since the spatial channel coefficients associated with different polarizations are uncorrelated. Thus even with L/2 spacing, a rank-2 transmission can occur quite often. Two different structures are possible. In the first structure the elements associated with different polarization groups are combined via the second stage precoding where Y collapses the two polarization groups into one.

$$W = \begin{bmatrix} \alpha_H XY \\ \alpha_V XY \end{bmatrix} \quad (6)$$

$$= \begin{bmatrix} \alpha_H \\ \alpha_V \end{bmatrix} \otimes (XY)$$

$$= \alpha \otimes (XY)$$

$$= \begin{bmatrix} X & 0 \\ 0 & X \end{bmatrix} (\alpha \otimes Y)$$

$$\equiv W_1 W_2$$

This scheme does not allow transmission higher than rank-4. In fact a rank>1 will not occur frequently with L/2 spacing. Thus equation (6) is more suitable for rank-1 transmission in this particular antenna setup. While this scheme may increase precoding diversity gain, the two different polarization groups should also be used spatial multiplexing due to the uncorrelated nature of the different polarization groups. To take advantage of such property, equation (6) can be expanded as follows:

$$W = \begin{bmatrix} X & 0 \\ 0 & X \end{bmatrix} \begin{bmatrix} \alpha_{HH} Y_1 & \alpha_{HV} Y_2 \\ \alpha_{VH} Y_1 & \alpha_{VV} Y_2 \end{bmatrix} \equiv W_1 W_2 \quad (7)$$

Equation (7) is reduced to equation (6) when $\alpha_{HV}$ and $\alpha_{VV}$ are set to zero. $Y_1$ and $Y_2$ can be the same or different. For this particular antenna setup, the matrix X can be constructed based on the oversampled 4 Tx DFT vectors. Analogous to the first embodiment, any oversampling factor can be used such as 4× oversampling or 8× oversampling. For the short-term and/or frequency selective component $W_2$ typical co-phasing coefficients can be used for $\{\alpha_H, \alpha_V\}$ or $\{\alpha_{HH}, \alpha_{VH}, \alpha_{HV}, \alpha_{VV}\}$. The coefficients belong to QPSK or 8PSK alphabet. Thus $\alpha_H = 1$ and $$\alpha_V = e^{j*2\pi \frac{k}{N}}$$

where $k=0, 1 \ldots N-1$ with an appropriate normalization. The matrix Y or $Y_1/Y_2$ represent selection or group selection of the columns of X.

The design in the second invention can also be used for 8 Tx ULA array since the block-diagonal design constructed from two 4 Tx DFT matrices can be used to generate all the 8 Tx DFT beam angles with appropriate co-phasing operation in $W_2$. This property holds due to the so-called butterfly property of DFT operations.

An exemplary first embodiment uses the 4× oversampled 4 Tx DFT vectors at generate 4 beam angles per polarization group. The beam angle space is partitioned into 4 non-overlapping groups resulting in $W_1$ of size 8×8 block diagonal matrix since X is a 4×4 matrix:

$$X^{(n)} = \frac{1}{2} \times \begin{bmatrix} 1 & 0 & 0 & 0 \\ 0 & (j)^n & 0 & 0 \\ 0 & 0 & (-1)^n & 0 \\ 0 & 0 & 0 & (-j)^n \end{bmatrix} \begin{bmatrix} 1 & 1 & 1 & 1 \\ 1 & e^{j\frac{\pi}{8}} & e^{j(2)\frac{\pi}{8}} & e^{j(3)\frac{\pi}{8}} \\ 1 & e^{j(2)\frac{\pi}{8}} & e^{j(2)(2)\frac{\pi}{8}} & e^{j(3)(2)\frac{\pi}{8}} \\ 1 & e^{j(3)\frac{\pi}{8}} & e^{j(2)(3)\frac{\pi}{8}} & e^{j(3)(3)\frac{\pi}{8}} \end{bmatrix}, \quad (8)$$

$$n = 0, 1, 2, 3$$

$$W_1^{(n)} = \begin{bmatrix} X^{(n)} & 0 \\ 0 & X^{(n)} \end{bmatrix}, \quad CB_1 = \{W_1^{(0)}, W_1^{(1)}, W_1^{(2)}, W_1^{(3)}\}$$

With the above choice of X, the following size-16 $W_2$ codebook design can be used for rank-1 transmission. Here QPSK co-phasing is used.

$$W_2 \in CB_2 = \quad (9)$$

$$\left\{ \frac{1}{\sqrt{2}} \begin{bmatrix} Y \\ Y \end{bmatrix}, \frac{1}{\sqrt{2}} \begin{bmatrix} Y \\ jY \end{bmatrix}, \frac{1}{\sqrt{2}} \begin{bmatrix} Y \\ -Y \end{bmatrix}, \frac{1}{\sqrt{2}} \begin{bmatrix} Y \\ -jY \end{bmatrix} \right\}$$

$$Y \in \left\{ \begin{bmatrix} 1 \\ 0 \\ 0 \\ 0 \end{bmatrix}, \begin{bmatrix} 0 \\ 1 \\ 0 \\ 0 \end{bmatrix}, \begin{bmatrix} 0 \\ 0 \\ 1 \\ 0 \end{bmatrix}, \begin{bmatrix} 0 \\ 0 \\ 0 \\ 1 \end{bmatrix} \right\}$$

For rank-2 transmission, the following $W_2$ codebook design can be used. This is also based on the QPSK alphabet and $Y_1 = Y_2 = Y$. In general $Y_1$ and $Y_2$ can be different.

$$W_2 \in CB_2 = \left\{ \frac{1}{\sqrt{2}} \begin{bmatrix} Y & Y \\ Y & -Y \end{bmatrix}, \frac{1}{\sqrt{2}} \begin{bmatrix} Y & Y \\ jY & -jY \end{bmatrix} \right\} \quad (10)$$

$$Y \in \left\{ \begin{bmatrix} 1 \\ 0 \\ 0 \\ 0 \end{bmatrix}, \begin{bmatrix} 0 \\ 1 \\ 0 \\ 0 \end{bmatrix}, \begin{bmatrix} 0 \\ 0 \\ 1 \\ 0 \end{bmatrix}, \begin{bmatrix} 0 \\ 0 \\ 0 \\ 1 \end{bmatrix} \right\}$$

The first exemplary embodiment uses 16 4 Tx oversampled DFT beam angles for constructing X and partitions them into 4 non-overlapping groups. This results in 4 $W_1$ matrices. Alternatively, each X may be constructed with the same size 4×4 matrix which represents more than 4 overlapping groups of beam angles. Thus for each X two adjacent X matrices will overlap in 2 beam angles. This is motivated to reduce the so-called edge effect in the precoder selection since $W_1$ is typically chosen before $W_2$. This is relevant only for frequency-selective precoding where different precoders $W = W_1 * W_2$ can be used for different parts of the transmission bandwidth such as sub-bands.

Based this design philosophy, a second exemplary embodiment is described in equation (11) with appropriate scalar normalization.

$$B = [\, b_0 \quad b_1 \quad \ldots \quad b_{N-1}\,], \; [B]_{1+m,1+n} = e^{j\frac{2\pi mn}{16}}, \quad (11)$$

$$m = 0, 1, 2, 3 \; n = 0, 1, \ldots, N-1$$

$$X^{(k)} \in \left\{ [\, b_{(N_b k/2)\bmod N} \quad b_{(N_b k/2+1)\bmod N} \quad \ldots \quad b_{(N_b k/2+N_b-1)\bmod N}\,] : \right.$$

$$\left. k = 0, 1, \ldots, \frac{2N}{N_b} - 1 \right\}$$

$$W_1^{(k)} = \begin{bmatrix} X^{(k)} & 0 \\ 0 & X^{(k)} \end{bmatrix}, \; C_1 = \{W_1^{(0)}, W_1^{(1)}, W_1^{(2)}, \ldots, W_1^{(2N/N_b)-1}\}$$

where: $W_1$ is a block diagonal matrix of X; X is a 4×Nb matrix; and Nb denotes the number of adjacent 4 Tx DFT beams contained in X. Such a design is able to synthesize N 4 Tx DFT beams within each polarization group. For a given N, the spatial oversampling factor is essentially N/4. The overall 4 Tx DFT beam collections are captured in the 4×N matrix B. Using co-phasing in $W_2$ the composite precoder W can synthesize up to N 8 Tx DFT beams. Allowing an overlapping of Nb/2 beam angles between two consecutively-indexed $W_1$ matrices, the set of $W_1$ matrices represents (2N/Nb)-level partitioning of the N 4 Tx beam angles in X, each polarization group. This design results in a codebook size of 2N/Nb for W. The construction of $W_2$ codebook can be performed accordingly.

Based on the overlapping design given in equation (11), some exemplary constructions for $W_2$ codebook are given below. To construct at least 16 8 Tx DFT beam angles, N=16 is chosen. As the choice of $W_1$ codebook can be different for different transmission ranks, one $W_1$ codebook design is chosen for ranks 1 and 2, and another $W_1$ codebook design chosen for ranks 3 and 4. For ranks 1 and 2, Nb=4 allows good trade-off between frequency-selective precoding gain and feedback overhead. For ranks 3 and 4, Nb=8 accommodates higher-rank transmission which tends to undergo channels with richer scattering. The complete design for ranks 1, 2, 3, and 4 are given below. For rank-5 to 8, 8 Tx precoding tends to be limited for practical antenna setups. Thus the design for rank-5 to 8 is not given thus fixed precoding can be used. The examples below use the following notations: (1) $\tilde{e}_n$ is a 4×1 selection vector with all zeros except for the n-th element with value 1; (2) $e_n$ is a 8×1 selection vector with all zeros except for the n-th element with value 1. The $W_2$ matrix chooses a column vector or a group of column vectors from the $W_1$ matrix for each polarization group where each group is represented by one of the two block diagonal components while performing some co-phasing operation across the two polarization groups.

Rank-1:

$$B = [\, b_0 \quad b_1 \quad \ldots \quad b_{15}\,], \; [B]_{1+m,1+n} = e^{j\frac{2\pi mn}{16}},$$

$$m = 0, 1, 2, 3 \; n = 0, 1, \ldots, 15$$

$$X^{(k)} \in$$

$$\{[\, b_{(2k)\bmod 16} \quad b_{(2k+1)\bmod 16} \quad b_{(2k+2)\bmod 16} \quad b_{(2k+3)\bmod 16}\,] : k = 0, 1, \ldots, 7\}$$

$$W_1^{(k)} = \begin{bmatrix} X^{(k)} & 0 \\ 0 & X^{(k)} \end{bmatrix}, \; C_1 = \{W_1^{(0)}, W_1^{(1)}, W_1^{(2)}, \ldots, W_1^{(7)}\}$$

$$W_2 \in CB_2 = \left\{ \frac{1}{\sqrt{2}}\begin{bmatrix} Y \\ Y \end{bmatrix}, \frac{1}{\sqrt{2}}\begin{bmatrix} Y \\ jY \end{bmatrix}, \frac{1}{\sqrt{2}}\begin{bmatrix} Y \\ -Y \end{bmatrix}, \frac{1}{\sqrt{2}}\begin{bmatrix} Y \\ -jY \end{bmatrix} \right\},$$

$$Y \in \{\tilde{e}_1, \tilde{e}_2, \tilde{e}_3, \tilde{e}_4\}$$

Rank-2:
The $W_1$ codebook design is the same as rank-1.

$$W_2 \in CB_2 = \left\{ \frac{1}{\sqrt{2}}\begin{bmatrix} Y_1 & Y_2 \\ Y_1 & -Y_2 \end{bmatrix}, \frac{1}{\sqrt{2}}\begin{bmatrix} Y_1 & Y_2 \\ jY_1 & -jY_2 \end{bmatrix} \right\}$$

$(Y_1, Y_2) \in$ $\{(\tilde{e}_1, \tilde{e}_1), (\tilde{e}_2, \tilde{e}_2), (\tilde{e}_3, \tilde{e}_3), (\tilde{e}_4, \tilde{e}_4), (\tilde{e}_1, \tilde{e}_2), (\tilde{e}_2, \tilde{e}_3), (\tilde{e}_1, \tilde{e}_4), (\tilde{e}_2, \tilde{e}_4)\}$ Rank-3:

$$B = [\, b_0 \quad b_1 \quad \ldots \quad b_{15}\,], \; [B]_{1+m,1+n} = e^{j\frac{2\pi mn}{16}},$$

$$m = 0, 1, 2, 3 \; n = 0, 1, \ldots, 15$$

$$X^{(k)} \in \{[\, b_{(4k)\bmod 16} \quad b_{(4k+1)\bmod 16} \quad \ldots \quad b_{(4k+7)\bmod 16}\,] : k = 0, 1, 2, 3\}$$

$$W_1^{(k)} = \begin{bmatrix} X^{(k)} & 0 \\ 0 & X^{(k)} \end{bmatrix}, \; C_1 = \{W_1^{(0)}, W_1^{(1)}, W_1^{(2)}, W_1^{(3)}\}$$

$$W_2 \in CB_2 = \left\{ \frac{1}{\sqrt{2}}\begin{bmatrix} Y_1 & Y_2 \\ Y_1 & -Y_2 \end{bmatrix} \right\}$$

$(Y_1, Y_2) \in$ $$\left\{ \begin{array}{l} (e_1, [\, e_1 \; e_5\,]), (e_2, [\, e_2 \; e_6\,]), (e_3, [\, e_3 \; e_7\,]), (e_4, [\, e_4 \; e_8\,]), \\ (e_5, [\, e_1 \; e_5\,]), (e_6, [\, e_2 \; e_6\,]), (e_7, [\, e_3 \; e_7\,]), (e_8, [\, e_4 \; e_8\,]), \\ ([\, e_1 \; e_5\,], e_5), ([\, e_2 \; e_6\,], e_6), ([\, e_3 \; e_7\,], e_7), ([\, e_4 \; e_8\,], e_8), \\ ([\, e_5 \; e_1\,], e_1), ([\, e_6 \; e_2\,], e_2), ([\, e_7 \; e_3\,], e_3), ([\, e_8 \; e_4\,], e_4) \end{array} \right\}$$

Rank-4:
The $W_1$ codebook design is the same as rank-3.

$$W_2 \in CB_2 = \left\{ \frac{1}{\sqrt{2}}\begin{bmatrix} Y & Y \\ Y & -Y \end{bmatrix}, \frac{1}{\sqrt{2}}\begin{bmatrix} Y & Y \\ jY & -jY \end{bmatrix} \right\}$$

$Y \in \{[\, e_1 \; e_5\,], [\, e_2 \; e_6\,], [\, e_3 \; e_7\,], [\, e_4 \; e_8\,]\}$

Other exemplary constructions, variations, and embodiments can be designed based on these principles. These two designs are not exclusive of each other. It is possible to combine designs 1 and 2 into one codebook framework as depicted in FIG. 3. The different $W_1$ matrices corresponding to different designs are enumerated with $PMI_1$ while the codebook $CB_2$ for $W_2$ is dependent on the choice of $W_1$. Such a setup allows the 8 Tx design to accommodate for several scenarios including 8 Tx ULA and pairs of dual-polarized elements. It is also possible to include other designs for $W_1$ such as a Grassmanian codebook or virtual antenna selection components which are suitable for low spatial correlation. The $W_2$ codebook can be different for different $W_1$ matrices. While the codebook example is presented covering a multi-rank format of rank-1 to rank-4, any multi-rank design constructed from taking at least one rank-specific codebook(s) from one example and some other rank-specific codebook(s) from other example(s) is not precluded. A multi-rank codebook may be constructed from a subset of a design. It is possible to construct a multi-rank codebook which uses the rank-1 and rank-2 designs from any of the examples below but which uses a fixed matrix precoding "size-1 codebook" for rank-3 and above.

Some UE feedback signaling mechanisms to support the dual-codebook designs given above in the context of 3GPP LTE-Advanced systems. In LTE Rel. 8 and 9, there are currently two UE feedback mechanisms for PMI reporting: (1) Periodic reporting on Physical Uplink Control CHannel (PUCCH) with the content possibly piggybacked onto Physical Uplink Shared CHannel (PUSCH) in the presence of uplink (UL) grant with wideband frequency non-selective PMI; and (2) Aperiodic reporting on PUSCH which allows frequency-selective PMI reporting. For LTE-A, some new reporting schemes may be introduced such as periodic PUSCH and new formats on PUCCH and PUSCH based reports. A UE may transmit on both PUCCH and PUSCH at the same time. This patent application focuses on how the two-stage PMI is periodically reported on PUCCH. Reporting $PMI_1$ long-term PMI can be treated analogous to rank indicator (RI) where the reporting interval for RI can be configured larger than channel quality indicator/precoding matrix indicator (CQI/PMI) for PUCCH based reporting. Thus the reporting mechanism for the long-term $PMI_1$ can be designed as follows:

(1) The reporting instances subframes of $PMI_1$ are aligned (identical) with those of RI. $PMI_1$ is reported in the same subframes as RI. This is a reasonable solution to avoid complication due to inter-dependence among reports. The following possibilities exist: $PMI_1$ is reported at the same periodicity as RI; and $PMI_1$ is reported at larger periodicity than RI where the periodicity of $PMI_1$ is an integer Q multiple of that of RI (Q=1, 2, 3 . . . ). The first possibility is a special case of the second where the integer multiple is 1.

(2) While it is possible to reserve a different PUCCH resource for reporting $PMI_1$, this seems unnecessary since the PUCCH resource used for reporting RI which is at most 3 bits for 8 Tx can still accommodate a few more bits as long as the payload size of $PMI_1$ is not excessive. Thus $PMI_1$ is not only reported at the same subframes as RI, but also shares the same PUCCH resource as RI. $PMI_2$ is then treated as the Rel. 8/9 LTE PMI which is reported together with CQI.

Figure 5:
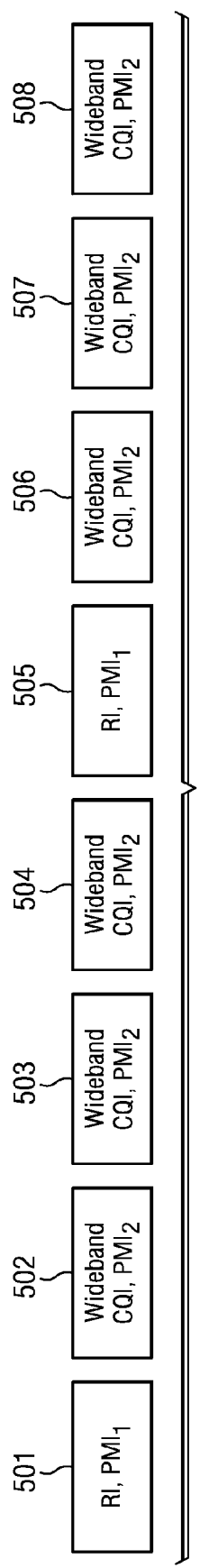
FIG. 5 is an example of reporting configuration where the first PMI ($PMI_1$) is reported together with RI and separately from the second PMI ($PMI_2$)

FIG. 5 illustrates an example where the reporting periodicity of $RI/PMI_1$ is 4× as that of wideband $CQI/PMI_2$ with reporting offset of zero where $PMI_1$ has the same periodicity as the RI. Subframes 501 and 505 report both RI and $PMI_1$. Subframes 502, 5032, 504, 506, 507 and 508 report wideband CQI and $PMI_2$. Thus the periodicity of $RI/PMI_1$ is 4× as that of wideband $CQI/PMI_2$.

Figure 6:
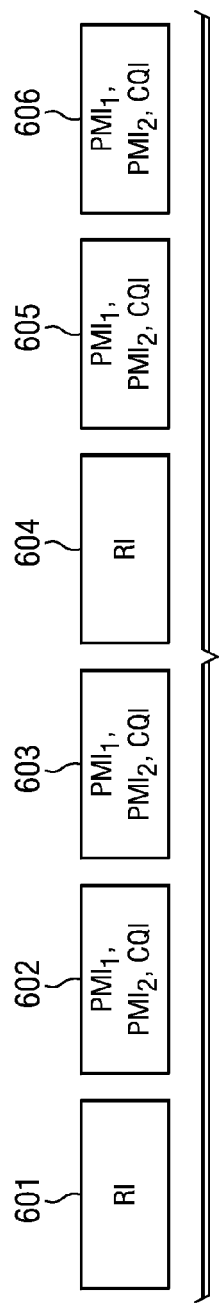
FIG. 6 is an example of reporting configuration where the first PMI ($PMI_1$) is reported together with the second PMI ($PMI_2$) and separately from RI.

As an alternative, the reporting periodicity subframes of $PMI_1$ can be smaller than that of RI. There are several possibilities. In one embodiment, $PMI_1$ is reported with the same periodicity as $PMI_2$. In this case $PMI_1$ and $PMI_2$ possess the same time-domain granularity are always reported together. The RI reporting periodicity is O times that of the $PMI_1/PMI_2$ reporting periodicity where O is a positive integer. The frequency-domain granularity of $PMI_1$ and $PMI_2$ may be different. $PMI_1$ may be a wideband precoder while $PMI_2$ may be either wideband or subband. FIG. 6 illustrates an example of this periodicity. Subframes 601 and 604 report RI. Subframes 602, 603, 605 and 606 report $PMI_1$, $PMI_2$ and CQI.

Figure 7:
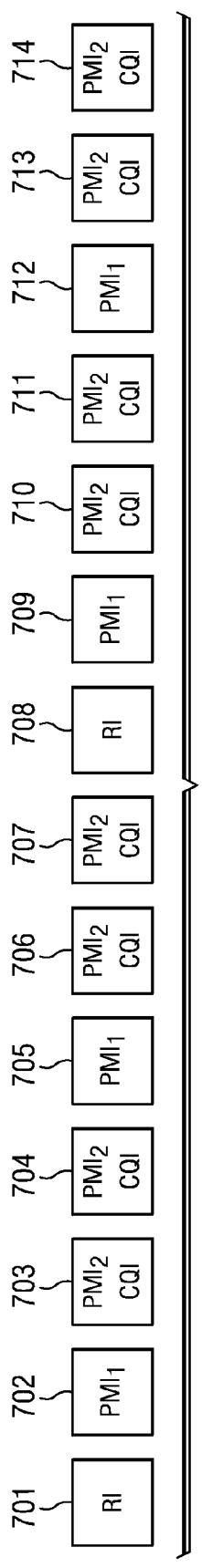
FIG. 7 is an example of reporting configuration where the first PMI ($PMI_1$) and the second PMI ($PMI_2$) are reported separately from each other and from RI.

In another embodiment, $PMI_1$ is reported at larger periodicity than $PMI_2$ and RI is reported at larger periodicity than $PMI_1$. For example, RI reporting periodicity is O1 times that of reporting periodicity of $PMI_1$ and $PMI_1$ periodicity is O2 times that of $PMI_2$. This is illustrated in FIG. 7. Subframes 701 and 708 report RI. Subframes 702, 705, 709 and 712 report $PMI_1$. Subframes 703, 704, 706, 707, 710, 711, 713 and 714 report $PMI_2$ and CQI. This is perhaps the least desirable mode of operation despite its apparent flexibility.

The description of this invention has focused on the design of codebooks and its associated signaling for 8-antenna (8 Tx) systems. Those familiar with the art would understand that this invention can be extended to different number of transmit antennas at the eNodeB. An extension for 4 Tx systems in the context of 3GPP LTE is as follows. 3GPP LTE Release 8 (Rel. 8) supports a codebook-based precoding and feedback for 4 Tx systems. Using the dual-codebook product design $W=W_1W_2$, it is possible to augment the Release 8 design for performance improvement with lower rank transmissions such as rank-1 and/or rank-2. This can benefit MU-MIMO operation. One possible embodiment uses the Rel. 8 4 Tx codebook for the short-term precoding component $W_2$. $W_1$ is then defined to achieve the design goal. This permits the designer to add more $W_1$ matrices to cater for spatial channel scenarios such as antenna setup, angular spread, etc.

One embodiment improves rank-1 transmission MU-MIMO performance for the 4 Tx ULA setup with L/2 spacing. The Rel. 8 4 Tx codebook includes 8 4 Tx and hence 2× oversampling DFT vectors, additional DFT vectors allow higher spatial resolution using 16 4 Tx DFT vectors including those from the Rel. 8 codebook. If the DFT vectors from the Rel. 8 codebook are used, a possible embodiment is:

(1) For a given value of n spatial/angular oversampling factor, n contiguous groups are defined.

(2) The size of each contiguous group is 4. Each contiguous group is associated with one $W_1$ matrix. For the i-th group (i=0, 1, . . . , n−1):

$$W_1^{(i)} = \frac{1}{2}\begin{bmatrix} 1 & 1 & 1 & 1 \\ 1 & j & -1 & -j \\ 1 & -1 & 1 & -1 \\ 1 & -j & -1 & j \end{bmatrix}^H \quad (12)$$

$$\left(\frac{1}{2} \times \begin{bmatrix} 1 & 0 & 0 & 0 \\ 0 & e^{j(4)\frac{\pi}{2n}i} & 0 & 0 \\ 0 & 0 & e^{j(2)(4)\frac{\pi}{2n}i} & 0 \\ 0 & 0 & 0 & e^{j(3)(4)\frac{\pi}{2n}i} \end{bmatrix} \begin{bmatrix} 1 & 1 & 1 & 1 \\ 1 & e^{j\frac{\pi}{2n}} & e^{j(2)\frac{\pi}{2n}} & e^{j(3)\frac{\pi}{2n}} \\ 1 & e^{j(2)\frac{\pi}{2n}} & e^{j(2)(2)\frac{\pi}{2n}} & e^{j(2)(3)\frac{\pi}{2n}} \\ 1 & e^{j(3)\frac{\pi}{2n}} & e^{j(2)(3)\frac{\pi}{2n}} & e^{j(3)(3)\frac{\pi}{2n}} \end{bmatrix}\right)$$

$$= \frac{1}{4}\begin{bmatrix} 1 & 1 & 1 & 1 \\ 1 & -j & -1 & j \\ 1 & -1 & 1 & -1 \\ 1 & j & -1 & -j \end{bmatrix}\begin{bmatrix} 1 & 0 & 0 & 0 \\ 0 & e^{j(4)\frac{\pi}{2n}i} & 0 & 0 \\ 0 & 0 & e^{j(2)(4)\frac{\pi}{2n}i} & 0 \\ 0 & 0 & 0 & e^{j(3)(4)\frac{\pi}{2n}i} \end{bmatrix} \begin{bmatrix} 1 & 1 & 1 & 1 \\ 1 & e^{j\frac{\pi}{2n}} & e^{j(2)\frac{\pi}{2n}} & e^{j(3)\frac{\pi}{2n}} \\ 1 & e^{j(2)\frac{\pi}{2n}} & e^{j(2)(2)\frac{\pi}{2n}} & e^{j(2)(3)\frac{\pi}{2n}} \\ 1 & e^{j(3)\frac{\pi}{2n}} & e^{j(2)(3)\frac{\pi}{2n}} & e^{j(3)(3)\frac{\pi}{2n}} \end{bmatrix}$$

Only the first 4 DFT vectors in equation (12) are used for $CB_2$ for v=1 codebook. That is:

$$CB_2 = \frac{1}{2}\begin{bmatrix} 1 & 1 & 1 & 1 \\ 1 & j & -1 & -j \\ 1 & -1 & 1 & -1 \\ 1 & -j & -1 & j \end{bmatrix} \quad (13)$$

(in the form of 4×4 matrix)

Note that in equation (12) the 4-DFT matrix forms a complete orthonormal basis for 4-dimensional complex vector space. For n=4, this design results in 4 contiguous groups (which results in a 2-bit $PMI_1$ per PMI report) and 2-bit $PMI_2$ for rank-1 for v=1.

To allow a natural dynamic switching with SU-MIMO applications where the other 8 vectors in the v=1 codebook may be more useful, this codebook can augment the Rel. 8 4 Tx codebook. For the original Rel. 8 codebook, $W_1$ is chosen to be an identity matrix where $CB_2$ is simply the Rel. 8 codebook. This allows dynamic switching between the two $W_1$ matrices via an update of $PMI_1$. When $PMI_1$ indicates that $W_1$ identity is chosen, $CB_2$ is chosen as the original Rel. 8 codebook. When $PMI_1$ indicates some other $W_1$, $W_1$ and $CB_2$ are chosen as the enhanced component given above.

Another embodiment is applicable for rank-1 or rank-2 transmissions aimed at improving MU-MIMO performance for the 4 Tx dual-polarized antenna setup. The enhanced component can be designed independently of the Rel. 8 codebook. The enhanced component can be combined with the Rd. 8 codebook via the same augmentation procedure of choosing $W_1$. That is:

(1) When $PMI_1$ indicates that $W_1$ identity is chosen. $CB_2$ is chosen as the original Rel. 8 codebook.

(2) When $PMI_1$ indicates some other $W_1$, $W_1$ and $CB_2$ are chosen as the enhanced component.

For the enhanced components not including when $W_1$ is the identity matrix and $CB_2$ is the Rel. 8 codebook, a design similar to the 8 Tx counterpart can be used. For example, a Nb/2 overlapping beam design is used for W. This can be written as follows.

$$B = [b_0 \; b_1 \; \ldots \; b_{N-1}], [B]_{1+m,1+n} = \frac{1}{\sqrt{2}} e^{j\frac{2\pi mn}{N}}, \quad (14)$$

$$m = 0, 1 \; n = 0, 1, \ldots, N-1$$

$$X^{(k)} \in \{[b_{(N_b k/2)\bmod N} \; b_{(N_b k/2+1)\bmod N} \; \ldots \; b_{(N_b k/2+N_b-1)\bmod N}] : k = 0, 1, \ldots, \frac{2N}{N_b} - 1\}$$

$$W_1^{(k)} = \begin{bmatrix} X^{(k)} & 0 \\ 0 & X^{(k)} \end{bmatrix}, C_1 = \{W_1^{(0)}, W_1^{(1)}, W_1^{(2)}, \ldots, W_1^{(2N/N_b)-1}\}$$

The same $W_2$ design as that for the 8 Tx case can be applied for a given value of N and Nb. The following design concept for $W_2$ can be used for the enhanced components.

(1) The first part of $W_2$ utilizes beam selection or beam group selection within each polarization group. The same or different beam(s) can be used for different polarization groups.

(2) The second part of $W_2$ utilizes co-phasing between two different polarization groups. The co-phasing can be done with a unitary vector or matrix assuming a certain alphabet size such as QPSK or 8PSK.

The combination of beam selection and co-phasing in $W_2$ combined with $W_1$ should result in a unitary precoder $W=W_1*W_2$.

Assuming the same beam (group) selection for different polarization groups and QPSK-based co-phasing, the following $W_2$ design can be used for:

Nb=2:
Rank-1:

$$W_2 \in CB_2 = \left\{\frac{1}{\sqrt{2}}\begin{bmatrix} Y \\ Y \end{bmatrix}, \frac{1}{\sqrt{2}}\begin{bmatrix} Y \\ jY \end{bmatrix}, \frac{1}{\sqrt{2}}\begin{bmatrix} Y \\ -Y \end{bmatrix}, \frac{1}{\sqrt{2}}\begin{bmatrix} Y \\ -jY \end{bmatrix}\right\},$$

$$Y \in \left\{\begin{bmatrix} 1 \\ 0 \end{bmatrix}, \begin{bmatrix} 0 \\ 1 \end{bmatrix}\right\}$$

Rank-2:

$$W_2 \in CB_2 = \left\{\frac{1}{\sqrt{2}}\begin{bmatrix} Y & Y \\ Y & -Y \end{bmatrix}, \frac{1}{\sqrt{2}}\begin{bmatrix} Y & Y \\ jY & -jY \end{bmatrix}\right\},$$

$$Y \in \left\{\begin{bmatrix} 1 \\ 0 \end{bmatrix}, \begin{bmatrix} 0 \\ 1 \end{bmatrix}\right\}$$

Nb=4:
Rank-1:

$$W_2 \in CB_2 = \left\{\frac{1}{\sqrt{2}}\begin{bmatrix} Y \\ Y \end{bmatrix}, \frac{1}{\sqrt{2}}\begin{bmatrix} Y \\ jY \end{bmatrix}, \frac{1}{\sqrt{2}}\begin{bmatrix} Y \\ -Y \end{bmatrix}, \frac{1}{\sqrt{2}}\begin{bmatrix} Y \\ -jY \end{bmatrix}\right\},$$

$$Y \in \left\{\begin{bmatrix} 1 \\ 0 \\ 0 \\ 0 \end{bmatrix}, \begin{bmatrix} 0 \\ 1 \\ 0 \\ 0 \end{bmatrix}, \begin{bmatrix} 0 \\ 0 \\ 1 \\ 0 \end{bmatrix}, \begin{bmatrix} 0 \\ 0 \\ 0 \\ 1 \end{bmatrix}\right\}$$

Rank-2:

$$W_2 \in CB_2 = \left\{\frac{1}{\sqrt{2}}\begin{bmatrix} Y & Y \\ Y & -Y \end{bmatrix}, \frac{1}{\sqrt{2}}\begin{bmatrix} Y & Y \\ jY & -jY \end{bmatrix}\right\},$$

$$Y \in \left\{\begin{bmatrix} 1 \\ 0 \\ 0 \\ 0 \end{bmatrix}, \begin{bmatrix} 0 \\ 1 \\ 0 \\ 0 \end{bmatrix}, \begin{bmatrix} 0 \\ 0 \\ 1 \\ 0 \end{bmatrix}, \begin{bmatrix} 0 \\ 0 \\ 0 \\ 1 \end{bmatrix}\right\}$$

Nb=8: Here, $e_n$ denotes an 8×1 selection vector with all zeros except for the n-th element with value 1.

Rank-1:

$$W_2 \in CB_2 = \left\{\frac{1}{\sqrt{2}}\begin{bmatrix} Y \\ Y \end{bmatrix}, \frac{1}{\sqrt{2}}\begin{bmatrix} Y \\ jY \end{bmatrix}, \frac{1}{\sqrt{2}}\begin{bmatrix} Y \\ -Y \end{bmatrix}, \frac{1}{\sqrt{2}}\begin{bmatrix} Y \\ -jY \end{bmatrix}\right\},$$

$$Y \in \{e_1, e_2, e_3, \ldots, e_8\}$$

Rank-2:

$$W_2 \in CB_2 = \left\{\frac{1}{\sqrt{2}}\begin{bmatrix} Y & Y \\ Y & -Y \end{bmatrix}, \frac{1}{\sqrt{2}}\begin{bmatrix} Y & Y \\ jY & -jY \end{bmatrix}\right\},$$

$$Y \in \{e_1, e_2, e_3, \ldots, e_8\}$$

For the rank-1 design, co-phasing with larger alphabet size can also be done. Although less advantageous this design can be expressed as follows assuming L-PSK co-phasing:

$$W_2 \in CB_2 = \left\{ \frac{1}{\sqrt{2}} \begin{bmatrix} Y \\ e^{j\frac{2\pi}{L}l} Y \end{bmatrix}, l = 0, 1, \ldots, L-1 \right\}$$

For the rank-2 design it is possible to select two different beam angles instead of one. This design may be beneficial for ULA scenarios. The rank-2 design for $W_2$ can be described in the following more generic formulation assuming QPSK-based co-phasing:

$$W_2 \in CB_2 = \left\{ \frac{1}{\sqrt{2}} \begin{bmatrix} Y_1 & Y_2 \\ Y_1 & -Y_2 \end{bmatrix}, \frac{1}{\sqrt{2}} \begin{bmatrix} Y_1 & Y_2 \\ jY_1 & -jY_2 \end{bmatrix} \right\}, \quad (15)$$

Notice that equation (15) is reduced to the previous examples when $Y_1=Y_2=Y$. If $Y_1$ is not equal to $Y_2$, then vectors $Y_1$ and $Y_2$ should be carefully chosen so that the resulting composite rank-2 precoder is unitary. This may not be possible for all combinations of N and Nb such as Nb<N/2.

With respect to the enhanced components, while the codebook example is presented covering multi-rank format such as rank-1 to rank-2, any multi-rank design constructed from taking at least one rank-specific codebook(s) from one example and some other rank-specific codebook(s) from other example(s) is possible. It is also possible to construct a multi-rank codebook from a subset of a design. A multi-rank codebook which uses the rank-1 design may be constructed from any of the examples below, but use the rank-2 design from another example. It is desirable to keep the maximum overhead associated with $W_2$ $PMI_2$ payload the same as Rel. 8. This implies that $PMI_2$ occupies no more than 4 bits. This may require a subset of all the possible $W_2$ matrices needs to be used for some cases to keep the size for $CB_2$ no more than 16. With Nb=8 rank-1, the possible total size of $CB_2$ is 32. To keep the size within 16, only 16 out of 32 matrices are selected to form $CB_2$. It is also possible to select an even smaller subset especially for rank-2. Since the main target of enhancement is MU-MIMO, it is possible not to use any enhancement for rank-2. Thus only the above rank-1 design is augmented with the Rel. 8 codebook. Furthermore, since the enhanced component is an augmentation of the Rel. 8 codebook, it will be combined with the Rel. 8 codebook based on the principle stated above. In this case, it is possible to further prune the enhanced codebook component due to redundancy such as some of the vectors/matrices in the enhanced component are identical to some of the vectors/matrices in the Rel. 8 codebook. This occurs since Rel. 8 codebook already contains 8 4 Tx DFT vectors in its rank-1 design. This can further reduce the size of $W_1$ and/or $W_2$ codebooks, or at least reduce the necessary $PMI_1/PMI_2$ payload which could be beneficial in some scenarios such as PUCCH based feedback. Using a subset or entirety of the above codebook design examples combined with some other designs is also within the scope of this invention which should be clear for those familiar with the art.

Two examples of complete design with augmentation are given below.

Example 1

Block Diagonal Overlapping GoB (N=8, Nb=4) Augmentation Only for Rank 1

$$B = [b_0 \; b_1 \; \ldots \; b_7], [B]_{1+m,1+n} = e^{j\frac{2\pi mn}{8}}, m = 0, 1 \; n = 0, 1, \ldots, 7$$

$$X^{(k)} \in \{[b_{(2k) \bmod 8} \; b_{(2k+1) \bmod 8} \; b_{(2k+2) \bmod 8} \; b_{(2k+3) \bmod 8}]: k = 0, 1, 2, 3\}$$

Rank 1:

$$W_1 \in C_1 = \left\{ I_4, \begin{bmatrix} X^{(0)} & 0 \\ 0 & X^{(0)} \end{bmatrix}, \begin{bmatrix} X^{(1)} & 0 \\ 0 & X^{(1)} \end{bmatrix}, \begin{bmatrix} X^{(2)} & 0 \\ 0 & X^{(2)} \end{bmatrix}, \begin{bmatrix} X^{(3)} & 0 \\ 0 & X^{(3)} \end{bmatrix} \right\}$$

Size-5 is the Rel. 8 codebook augmented with block diagonal GoB.

When $W_1=I_4$: $W_2 \in C_{2,R8Tx4r1}$, where $C_{2,R8Tx4r1}$ denotes the Rel. 8 4 Tx rank-1 codebook used for $W_2$.

When $W_1 = \begin{bmatrix} X^{(k)} & 0 \\ 0 & X^{(k)} \end{bmatrix}$ ($k = 0, 1, 2, 3$):

$$W_2 \in CB_2 = \left\{ \frac{1}{\sqrt{2}} \begin{bmatrix} Y \\ Y \end{bmatrix}, \frac{1}{\sqrt{2}} \begin{bmatrix} Y \\ jY \end{bmatrix}, \frac{1}{\sqrt{2}} \begin{bmatrix} Y \\ -Y \end{bmatrix}, \frac{1}{\sqrt{2}} \begin{bmatrix} Y \\ -jY \end{bmatrix} \right\},$$

$$Y \in \left\{ \begin{bmatrix} 1 \\ 0 \\ 0 \\ 0 \end{bmatrix}, \begin{bmatrix} 0 \\ 1 \\ 0 \\ 0 \end{bmatrix}, \begin{bmatrix} 0 \\ 0 \\ 1 \\ 0 \end{bmatrix}, \begin{bmatrix} 0 \\ 0 \\ 0 \\ 1 \end{bmatrix} \right\}$$

Rank 2:
$W_1=I_4$ is the size-1 Rel. 8 codebook only.
$W_2 \in C_{2,R8Tx4r2}$, where $C_{2,R8Tx4r2}$ denotes the Rel. 8 4 Tx rank-2 codebook used for $W_2$.
Rank 3:
$W_1=I_4$ is the size-1 Rel. 8 codebook only.
$W_2 \in C_{2,R8Tx4r3}$, where $C_{2,R8Tx4r3}$ denotes the Rel. 8 4 Tx rank-3 codebook used for $W_2$.
Rank 4:
$W_1=I_4$ is the size-1 Rel. 8 codebook only.
$W_2 \in C_{2,R8Tx4r4}$, where $C_{2,R8Tx4r4}$ denotes the Rel. 8 4 Tx rank-4 codebook used for $W_2$.

Example 2

Block Diagonal Non-Overlapping GoB (N=16, Nb=4) Augmentation Only for Rank 1

$$B = [b_0 \; b_1 \; \ldots \; b_{15}], [B]_{1+m,1+n} = e^{j\frac{2\pi mn}{16}}, m = 0, 1 \; n = 0, 1, \ldots, 15$$

$$X^{(k)} \in \{[b_{(4k) \bmod 16} \; b_{(4k+1) \bmod 16} \; b_{(4k+2) \bmod 16} \; b_{(4k+3) \bmod 16}]: k = 0, 1, 2, 3\}$$

Rank 1:

$$W_1 \in C_1 = \left\{ I_4, \begin{bmatrix} X^{(0)} & 0 \\ 0 & X^{(0)} \end{bmatrix}, \begin{bmatrix} X^{(1)} & 0 \\ 0 & X^{(1)} \end{bmatrix}, \begin{bmatrix} X^{(2)} & 0 \\ 0 & X^{(2)} \end{bmatrix}, \begin{bmatrix} X^{(3)} & 0 \\ 0 & X^{(3)} \end{bmatrix} \right\}$$

is the size-5 Rel. 8 codebook augmented with block diagonal GoB.

When $W_1=I_4$: $W_2 \in C_{2,R8Tx4r1}$, where $C_{2,R8Tx4r1}$ denotes the Rel. 8 4 Tx rank-1 codebook used for $W_2$.

When $W_1 = \begin{bmatrix} X^{(k)} & 0 \\ 0 & X^{(k)} \end{bmatrix}$ ($k = 0, 1, 2, 3$):

$$W_2 \in CB_2 = \left\{ \frac{1}{\sqrt{2}} \begin{bmatrix} Y \\ Y \end{bmatrix}, \frac{1}{\sqrt{2}} \begin{bmatrix} Y \\ jY \end{bmatrix}, \frac{1}{\sqrt{2}} \begin{bmatrix} Y \\ -Y \end{bmatrix}, \frac{1}{\sqrt{2}} \begin{bmatrix} Y \\ -jY \end{bmatrix} \right\},$$

$$Y \in \left\{ \begin{bmatrix} 1 \\ 0 \\ 0 \\ 0 \end{bmatrix}, \begin{bmatrix} 0 \\ 1 \\ 0 \\ 0 \end{bmatrix}, \begin{bmatrix} 0 \\ 0 \\ 1 \\ 0 \end{bmatrix}, \begin{bmatrix} 0 \\ 0 \\ 0 \\ 1 \end{bmatrix} \right\}$$

Rank 2:
$W_1=I_4$ is the size-1 Rel. 8 codebook only.
$W_2 \in C_{2,R8Tx4r2}$ where $C_{2,R8Tx4r2}$ denotes the Rel. 8 4 Tx rank-2 codebook used for $W_2$.

Rank 3:
$W_1=I_4$ is the size-1 Rel. 8 codebook only.
$W_2 \in C_{2,R8Tx4r3}$, where $C_{2,R8Tx4r3}$ denotes the Rel. 8 4 Tx rank-3 codebook used for $W_2$.

Rank 4:
$W_1=I_4$ is the size-1 Rel. 8 codebook only.
$W_2 \in C_{2,R8Tx4r4}$, where $C_{2,R8Tx4r4}$ denotes the Rel. 8 4 Tx rank-4 codebook used for $W_2$.

Figure 8:
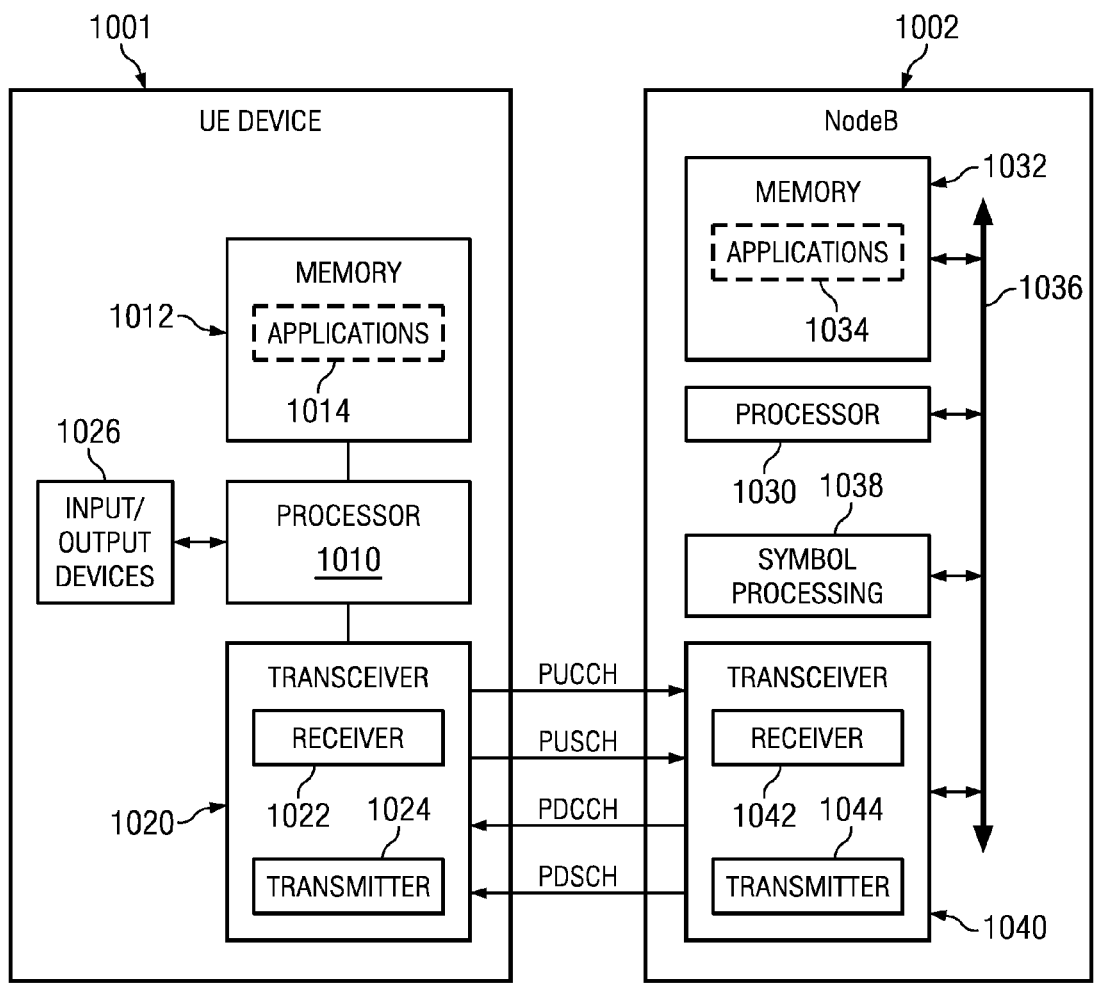
FIG. 8 is a block diagram illustrating internal details of a base station and a mobile user equipment in the network system of FIG. 1 suitable for implementing this invention.

FIG. 8 is a block diagram illustrating internal details of an eNB 1002 and a mobile UE 1001 in the network system of FIG. 1. Mobile UE 1001 may represent any of a variety of devices such as a server, a desktop computer, a laptop computer, a cellular phone, a Personal Digital Assistant (PDA), a smart phone or other electronic devices. In some embodiments, the electronic mobile UE 1001 communicates with eNB 1002 based on a LTE or Evolved Universal Terrestrial Radio Access Network (E-UTRAN) protocol. Alternatively, another communication protocol now known or later developed can be used.

Mobile UE 1001 comprises a processor 1010 coupled to a memory 1012 and a transceiver 1020. The memory 1012 stores (software) applications 1014 for execution by the processor 1010. The applications could comprise any known or future application useful for individuals or organizations. These applications could be categorized as operating systems (OS), device drivers, databases, multimedia tools, presentation tools, Internet browsers, emailers, Voice-Over-Internet Protocol (VOIP) tools, file browsers, firewalls, instant messaging, finance tools, games, word processors or other categories. Regardless of the exact nature of the applications, at least some of the applications may direct the mobile UE 1001 to transmit UL signals to eNB (base-station) 1002 periodically or continuously via the transceiver 1020. In at least some embodiments, the mobile UE 1001 identifies a Quality of Service (QoS) requirement when requesting an uplink resource from eNB 1002. In some cases, the QoS requirement may be implicitly derived by eNB 1002 from the type of traffic supported by the mobile UE 1001. As an example, VOIP and gaming applications often involve low-latency uplink (UL) transmissions while High Throughput (HTP)/Hypertext Transmission Protocol (HTTP) traffic can involve high-latency uplink transmissions.

Transceiver 1020 includes uplink logic which may be implemented by execution of instructions that control the operation of the transceiver. Some of these instructions may be stored in memory 1012 and executed when needed by processor 1010. As would be understood by one of skill in the art, the components of the uplink logic may involve the physical (PHY) layer and/or the Media Access Control (MAC) layer of the transceiver 1020. Transceiver 1020 includes one or more receivers 1022 and one or more transmitters 1024.

Processor 1010 may send or receive data to various input/output devices 1026. A subscriber identity module (SIM) card stores and retrieves information used for making calls via the cellular system. A Bluetooth baseband unit may be provided for wireless connection to a microphone and headset for sending and receiving voice data. Processor 1010 may send information to a display unit for interaction with a user of mobile UE 1001 during a call process. The display may also display pictures received from the network, from a local camera, or from other sources such as a Universal Serial Bus (USB) connector. Processor 1010 may also send a video stream to the display that is received from various sources such as the cellular network via RF transceiver 1020 or the camera.

During transmission and reception of voice data or other application data, transmitter 1024 may be or become non-synchronized with its serving eNB. In this case, it sends a random access signal. As part of this procedure, it determines a preferred size for the next data transmission, referred to as a message, by using a power threshold value provided by the serving eNB, as described in more detail above. In this embodiment, the message preferred size determination is embodied by executing instructions stored in memory 1012 by processor 1010. In other embodiments, the message size determination may be embodied by a separate processor/memory unit, by a hardwired state machine, or by other types of control logic, for example.

eNB 1002 comprises a Processor 1030 coupled to a memory 1032, symbol processing circuitry 1038, and a transceiver 1040 via backplane bus 1036. The memory stores applications 1034 for execution by processor 1030. The applications could comprise any known or future application useful for managing wireless communications. At least some of the applications 1034 may direct eNB 1002 to manage transmissions to or from mobile UE 1001.

Transceiver 1040 comprises an uplink Resource Manager, which enables eNB 1002 to selectively allocate uplink Physical Uplink Shared CHannel (PUSCH) resources to mobile UE 1001. As would be understood by one of skill in the art, the components of the uplink resource manager may involve the physical (PHY) layer and/or the Media Access Control (MAC) layer of the transceiver 1040. Transceiver 1040 includes at least one receiver 1042 for receiving transmissions from various UEs within range of eNB 1002 and at least one transmitter 1044 for transmitting data and control information to the various UEs within range of eNB 1002.

The uplink resource manager executes instructions that control the operation of transceiver 1040. Some of these instructions may be located in memory 1032 and executed when needed on processor 1030. The resource manager controls the transmission resources allocated to each UE 1001 served by eNB 1002 and broadcasts control information via the PDCCH.

Symbol processing circuitry 1038 performs demodulation using known techniques. Random access signals are demodulated in symbol processing circuitry 1038.

During transmission and reception of voice data or other application data, receiver 1042 may receive a random access signal from a UE 1001. The random access signal is encoded to request a message size that is preferred by UE 1001. UE 1001 determines the preferred message size by using a message threshold provided by eNB 1002. In this embodiment, the message threshold calculation is embodied by executing instructions stored in memory 1032 by processor 1030. In other embodiments, the threshold calculation may be embodied by a separate processor/memory unit, by a hardwired state machine, or by other types of control logic, for example. Alternatively, in some networks the message threshold is a fixed value that may be stored in memory 1032, for example. In response to receiving the message size request, eNB 1002 schedules an appropriate set of resources and notifies UE 1001 with a resource grant.

What is claimed is:

1. A method of transmitting data in a wireless communication system, comprising the steps of:
  forming one or more layers of data stream wherein each of the data streams consists of modulated symbols;
  generating an 8-by-N precoding matrix based on a precoding matrix indicator (PMI) feedback from at least one remote receiver wherein the PMI indicates a choice of precoding matrix W derived from a matrix multiplication of two matrices W1 and W2 from a first codebook C1 and a second codebook C2, respectively, wherein the first codebook C1 contains at least the following matrices when the number of layers N is one or two:

$$B = [\, b_0 \ \ b_1 \ \ \ldots \ \ b_{15}\,], \ [B]_{1+m,1+n} = e^{j\frac{2\pi mn}{16}},$$
$$m = 0, 1, 2, 3 \ n = 0, 1, \ldots, 15$$

$$X^{(k)} \in \{[\, b_{(2k) \bmod 16} \ \ b_{(2k+1) \bmod 16} \ \ b_{(2k+2) \bmod 16} \ \ b_{(2k+3) \bmod 16}\,]: k = 0, 1, \ldots 7\}$$

$$W_1^{(k)} = \begin{bmatrix} X^{(k)} & 0 \\ 0 & X^{(k)} \end{bmatrix}, \ C_1 = \{W_1^{(0)}, W_1^{(1)}, W_1^{(2)}, \ldots, W_1^{(7)}\};$$

precoding the one or more layers of data stream via multiplication with the 8-by-N precoding matrix where N is the number of said layers; and
  transmitting the precoded layers of data stream to the remote receiver.

2. The method of claim 1, wherein:
  the second codebook C2 contains at least the following matrices when the number of layers N is one and $\tilde{e}_n$ is a 4×1 selection vector with all zeros except for the n-th element with value 1:

$$W_2 \in CB_2 = \left\{ \frac{1}{\sqrt{2}}\begin{bmatrix} Y \\ Y \end{bmatrix}, \frac{1}{\sqrt{2}}\begin{bmatrix} Y \\ jY \end{bmatrix}, \frac{1}{\sqrt{2}}\begin{bmatrix} Y \\ -Y \end{bmatrix}, \frac{1}{\sqrt{2}}\begin{bmatrix} Y \\ -jY \end{bmatrix} \right\},$$
$$Y \in \{\tilde{e}_1, \tilde{e}_2, \tilde{e}_3, \tilde{e}_4\}.$$

3. The method of claim 1, wherein:
  the second codebook C2 contains at least the following matrices when the number of layers N is two and $\tilde{e}_n$ is a 4×1 selection vector with all zeros except for the n-th element with value 1:

$$W_2 \in CB_2 = \left\{ \frac{1}{\sqrt{2}}\begin{bmatrix} Y_1 & Y_2 \\ Y_1 & -Y_2 \end{bmatrix}, \frac{1}{\sqrt{2}}\begin{bmatrix} Y_1 & Y_2 \\ jY_1 & -jY_2 \end{bmatrix} \right\}$$

$(Y_1, Y_2) \in$ $\{(\tilde{e}_1, \tilde{e}_1), (\tilde{e}_2, \tilde{e}_2), (\tilde{e}_3, \tilde{e}_3), (\tilde{e}_4, \tilde{e}_4), (\tilde{e}_1, \tilde{e}_2), (\tilde{e}_2, \tilde{e}_3), (\tilde{e}_1, \tilde{e}_4), (\tilde{e}_2, \tilde{e}_4)\}.$ 4. A method of transmitting data in a wireless communication system, comprising the steps of:
  forming one or more layers of data stream wherein each of the data streams consists of modulated symbols;
  generating an 8-by-N precoding matrix based on a precoding matrix indicator (PMI) feedback from at least one remote receiver wherein the PMI indicates a choice of precoding matrix W derived from a matrix multiplication of two matrices W1 and W2 from a first codebook C1 and a second codebook C2, respectively, wherein the first codebook C1 contains at least the following matrices when the number of layers N is three or four:

$$B = [\, b_0 \ \ b_1 \ \ \ldots \ \ b_{15}\,], \ [B]_{1+m,1+n} = e^{j\frac{2\pi mn}{16}},$$
$$m = 0, 1, 2, 3 \ n = 0, 1, \ldots, 15$$

$$X^{(k)} \in \{[\, b_{(4k) \bmod 16} \ \ b_{(4k+1) \bmod 16} \ \ \ldots \ \ b_{(4k+7) \bmod 16}\,]: k = 0, 1, 2, 3\}$$

$$W_1^{(k)} = \begin{bmatrix} X^{(k)} & 0 \\ 0 & X^{(k)} \end{bmatrix}, \ C_1 = \{W_1^{(0)}, W_1^{(1)}, W_1^{(2)}, W_1^{(3)}\};$$

precoding the one or more layers of data stream via multiplication with the 8-by-N precoding matrix where N is the number of said layers; and
  transmitting the precoded layers of data stream to the remote receiver.

5. The method of claim 4, wherein:
  the second codebook C2 contains at least the following matrices when the number of layers N is three and $e_n$ is a 8×1 selection vector with all zeros except for the n-th element with value 1:

$$W_2 \in CB_2 = \left\{ \frac{1}{\sqrt{2}}\begin{bmatrix} Y_1 & Y_2 \\ Y_1 & -Y_2 \end{bmatrix} \right\}$$

$(Y_1, Y_2) \in$ $$\begin{Bmatrix} (e_1, [\, e_1 \ \ e_5\,]), & (e_2, [\, e_2 \ \ e_6\,]), & (e_3, [\, e_3 \ \ e_7\,]), & (e_4, [\, e_4 \ \ e_8\,]), \\ (e_5, [\, e_1 \ \ e_5\,]), & (e_6, [\, e_2 \ \ e_6\,]), & (e_7, [\, e_3 \ \ e_7\,]), & (e_8, [\, e_4 \ \ e_8\,]), \\ ([\, e_1 \ \ e_5\,], e_5), & ([\, e_2 \ \ e_6\,], e_6), & ([\, e_3 \ \ e_7\,], e_7), & ([\, e_4 \ \ e_8\,], e_8), \\ ([\, e_5 \ \ e_1\,], e_1), & ([\, e_6 \ \ e_2\,], e_2), & ([\, e_7 \ \ e_3\,], e_3), & ([\, e_8 \ \ e_4\,], e_4) \end{Bmatrix}.$$

6. The method of claim 4, wherein:
  the second codebook C2 contains at least the following matrices when the number of layers N is four and $e_n$ is a 8×1 selection vector with all zeros except for the n-th element with value 1:

$$W_2 \in CB_2 = \left\{ \frac{1}{\sqrt{2}}\begin{bmatrix} Y & Y \\ Y & -Y \end{bmatrix}, \frac{1}{\sqrt{2}}\begin{bmatrix} Y & Y \\ jY & -jY \end{bmatrix} \right\}$$

$Y \in \{[\, e_1 \ \ e_5\,], [\, e_2 \ \ e_6\,], [\, e_3 \ \ e_7\,], [\, e_4 \ \ e_8\,]\}.$

7. A method of transmitting data in a wireless communication system, comprising the steps of:
  transmitting a precoding matrix indicator (PMI) to a remote transceiver, wherein the PMI indicates a choice of precoding matrix W derived from a matrix multiplication of two matrices W1 and W2 from a first codebook C1 and a second codebook C2, respectively, wherein the first codebook C1 contains at least the following matrices when the number of layers N is one or two:

$$B = [\, b_0 \quad b_1 \quad \ldots \quad b_{15}\,], \quad [B]_{1+m,1+n} = e^{j\frac{2\pi mn}{16}},$$

$$m = 0, 1, 2, 3 \quad n = 0, 1, \ldots, 15$$

$$X^{(k)} \in$$

$$\{[\, b_{(2k)\bmod 16} \quad b_{(2k+1)\bmod 16} \quad b_{(2k+2)\bmod 16} \quad b_{(2k+3)\bmod 16}\,]: k = 0, 1, \ldots 7\}$$

$$W_1^{(k)} = \begin{bmatrix} X^{(k)} & 0 \\ 0 & X^{(k)} \end{bmatrix}, \quad C_1 = \{W_1^{(0)}, W_1^{(1)}, W_1^{(2)}, \ldots, W_1^{(7)}\}.$$

8. The method of claim 7, wherein:

the second codebook C2 contains at least the following matrices when the number of layers N is one and $\tilde{e}_n$ is a 4×1 selection vector with all zeros except for the n-th element with value 1:

$$W_2 \in CB_2 = \left\{ \frac{1}{\sqrt{2}} \begin{bmatrix} Y \\ Y \end{bmatrix}, \frac{1}{\sqrt{2}} \begin{bmatrix} Y \\ jY \end{bmatrix}, \frac{1}{\sqrt{2}} \begin{bmatrix} Y \\ -Y \end{bmatrix}, \frac{1}{\sqrt{2}} \begin{bmatrix} Y \\ -jY \end{bmatrix} \right\}.$$

$$Y \in \{\tilde{e}_1, \tilde{e}_2, \tilde{e}_3, \tilde{e}_4\}.$$

9. The method of claim 7, wherein:

the second codebook C2 contains at least the following matrices when the number of layers N is two and $\tilde{e}_n$ is a 4×1 selection vector with all zeros except for the n-th element with value 1:

$$W_2 \in CB_2 = \left\{ \frac{1}{\sqrt{2}} \begin{bmatrix} Y_1 & Y_2 \\ Y_1 & -Y_2 \end{bmatrix}, \frac{1}{\sqrt{2}} \begin{bmatrix} Y_1 & Y_1 \\ jY_1 & -jY_1 \end{bmatrix} \right\}$$

$$(Y_1, Y_2) \in$$

$$\{(\tilde{e}_1, \tilde{e}_1), (\tilde{e}_2, \tilde{e}_2), (\tilde{e}_3, \tilde{e}_3), (\tilde{e}_4, \tilde{e}_4), (\tilde{e}_1, \tilde{e}_2), (\tilde{e}_2, \tilde{e}_3), (\tilde{e}_1, \tilde{e}_4), (\tilde{e}_2, \tilde{e}_4)\}.$$

10. The method of claim 7, wherein:

the PMI feedback consists of two indices i1 and i2 which are periodically transmitted within a same set of subframes.

11. The method of claim 7, wherein:

the PMI feedback consists of two indices i1 and i2, i1 periodically transmitted within a same set of subframes as a rank indicator feedback, and i2 periodically transmitted within a different set of subframes from i1.

12. A method of transmitting data in a wireless communication system, comprising the steps of:

transmitting a precoding matrix indicator (PMI) to a remote transceiver, wherein the PMI indicates a choice of precoding matrix W derived from a matrix multiplication of two matrices W1 and W2 from a first codebook C1 and a second codebook C2, respectively, wherein the first codebook C1 contains at least the following matrices when the number of layers N is three or four:

$$B = [\, b_0 \quad b_1 \quad \ldots \quad b_{15}\,], \quad [B]_{1+m,1+n} = e^{j\frac{2\pi mn}{16}},$$

$$m = 0, 1, 2, 3 \quad n = 0, 1, \ldots, 15$$

$$X^{(k)} \in \{[\, b_{(4k)\bmod 16} \quad b_{(4k+1)\bmod 16} \quad \ldots \quad b_{(4k+7)\bmod 16}\,]: k = 0, 1, 2, 3\}$$

$$W_1^{(k)} = \begin{bmatrix} X^{(k)} & 0 \\ 0 & X^{(k)} \end{bmatrix}, \quad C_1 = \{W_1^{(0)}, W_1^{(1)}, W_1^{(2)}, W_1^{(3)}\}.$$

13. The method of claim 9, wherein:

the second codebook C2 contains at least the following matrices when the number of layers N is three and $e_n$ is a 8×1 selection vector with all zeros except for the n-th element with value 1:

$$W_2 \in CB_2 = \left\{ \frac{1}{\sqrt{2}} \begin{bmatrix} Y_1 & Y_2 \\ Y_1 & -Y_2 \end{bmatrix} \right\}$$

$$(Y_1, Y_2) \in$$

$$\left\{ \begin{array}{llll} (e_1, [\,e_1 \quad e_5\,]), & (e_2, [\,e_2 \quad e_6\,]), & (e_3, [\,e_3 \quad e_7\,]), & (e_4, [\,e_4 \quad e_8\,]), \\ (e_5, [\,e_1 \quad e_5\,]), & (e_6, [\,e_2 \quad e_6\,]), & (e_7, [\,e_3 \quad e_7\,]), & (e_8, [\,e_4 \quad e_8\,]), \\ ([\,e_1 \quad e_5\,], e_5), & ([\,e_2 \quad e_6\,], e_6), & ([\,e_3 \quad e_7\,], e_7), & ([\,e_4 \quad e_8\,], e_8), \\ ([\,e_5 \quad e_1\,], e_1), & ([\,e_6 \quad e_2\,], e_2), & ([\,e_7 \quad e_3\,], e_3), & ([\,e_8 \quad e_4\,], e_4) \end{array} \right\}.$$

14. The method of claim 7, wherein:

the second codebook C2 contains at least the following matrices when the number of layers N is four and $e_n$ is a 8×1 selection vector with all zeros except for the n-th element with value 1:

$$W_2 \in CB_2 = \left\{ \frac{1}{\sqrt{2}} \begin{bmatrix} Y & Y \\ Y & -Y \end{bmatrix}, \frac{1}{\sqrt{2}} \begin{bmatrix} Y & Y \\ jY & -jY \end{bmatrix} \right\}$$

$$Y \in \{[\,e_1 \quad e_5\,], [\,e_2 \quad e_6\,], [\,e_3 \quad e_7\,], [\,e_4 \quad e_8\,]\}.$$

* * * * *